United States Patent [19]

Barwise

[11] Patent Number: 5,141,386
[45] Date of Patent: Aug. 25, 1992

[54] LOAD HANDLING APPARATUS WITH SEPARABLE LOAD COUPLING

[76] Inventor: Robert D. Barwise, Rte. 2, Box 208, Bovey, Minn. 55709

[21] Appl. No.: 537,234

[22] Filed: Sep. 28, 1990

[51] Int. Cl.$^5$ ............................................. B66C 1/42
[52] U.S. Cl. .............................. 414/729; 137/614.04; 137/595; 137/377; 212/100; 403/348; 403/23
[58] Field of Search .................. 414/729, 738, 739; 294/86.4; 212/167, 141, 125, 100; 403/348, 349, 23; 137/614.04, 595, 377

[56] References Cited

U.S. PATENT DOCUMENTS

| | | |
|---|---|---|
| 2,691,451 | 4/1951 | Westfall . |
| 3,243,066 | 3/1966 | Gardner et al ................. 414/723 X |
| 3,362,550 | 2/1967 | Kappler . |
| 3,477,596 | 11/1966 | Michaelson et al. . |
| 3,741,526 | 6/1973 | Kasin et al. . |
| 3,746,193 | 7/1973 | Eaves . |
| 3,823,459 | 7/1974 | Vladimirovich et al. ......... 294/86.4 |
| 3,841,507 | 10/1974 | Barwise . |
| 3,860,282 | 1/1975 | Johnson ........................ 212/167 X |
| 4,315,652 | 2/1982 | Barwise . |
| 4,342,534 | 8/1982 | Bestard et al. .................. 414/739 X |
| 4,694,859 | 9/1987 | Smith ............................ 137/614.04 |
| 4,773,788 | 9/1988 | Ruhl .............................. 403/348 X |
| 4,938,651 | 7/1990 | Gilmos et al. ...................... 414/694 |
| 4,958,981 | 9/1990 | Uchihashi ...................... 414/723 X |

FOREIGN PATENT DOCUMENTS 15880  9/1989  United Kingdom .............. 403/348

OTHER PUBLICATIONS

Johnson Skidding Grapple brochure.

Primary Examiner—Robert J. Spar
Assistant Examiner—Donald W. Underwood
Attorney, Agent, or Firm—Burd, Bartz & Gutenkauf

[57] ABSTRACT

A load handling vehicle for movement of a load such as a drag of logs over rough terrain. The vehicle has a grapple assembly for lifting one end of a load for dragging the load over the terrain with one end elevated. The grapple assembly is connected to the boom of the skidder vehicle by a releasable load coupling. The grapple assembly is hydraulically actuated and hydraulically connected to the tow vehicle for that purpose. A mainline is connected at one end to the grapple assembly and at the other end to the tow vehicle and engages a powered winch drum permitting playing out and allowing for reeling in of the mainline. The grapple assembly is detachable from the tow vehicle by disconnecting the load coupling. When the grapple assembly is detached from the tow vehicle, it still engages the load and can be dragged by the tow vehicle using the mainline over the rough terrain. The skidder operator operates the vehicle in such a configuration when the terrain is too rugged to permit operation of the vehicle as a grapple skidder. Once clear of the adverse terrain, the operator can reattach the grapple assembly to the boom structure from the vehicle, then lift the load to the transport position and resume operation as a grapple skidder.

37 Claims, 12 Drawing Sheets

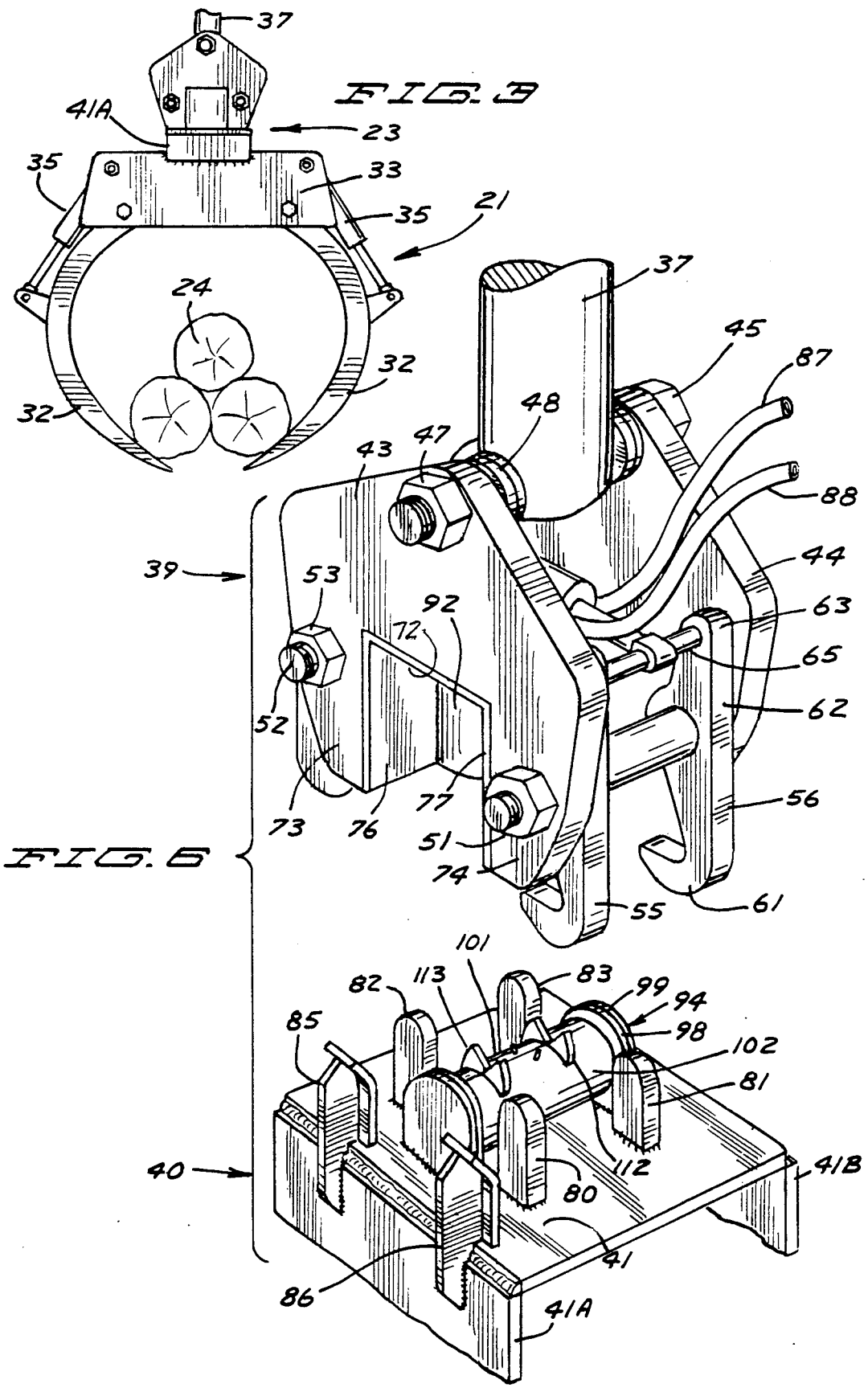

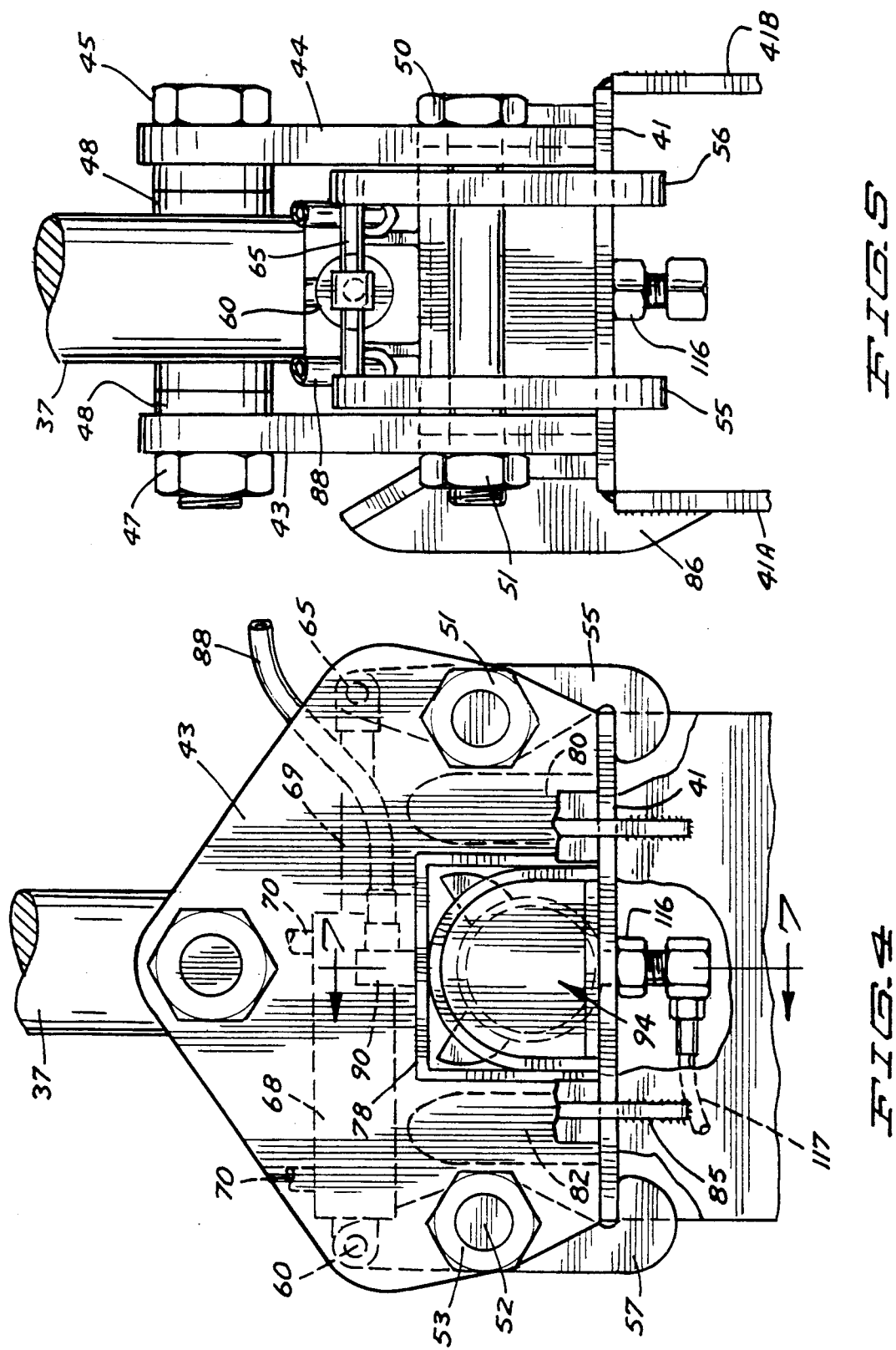

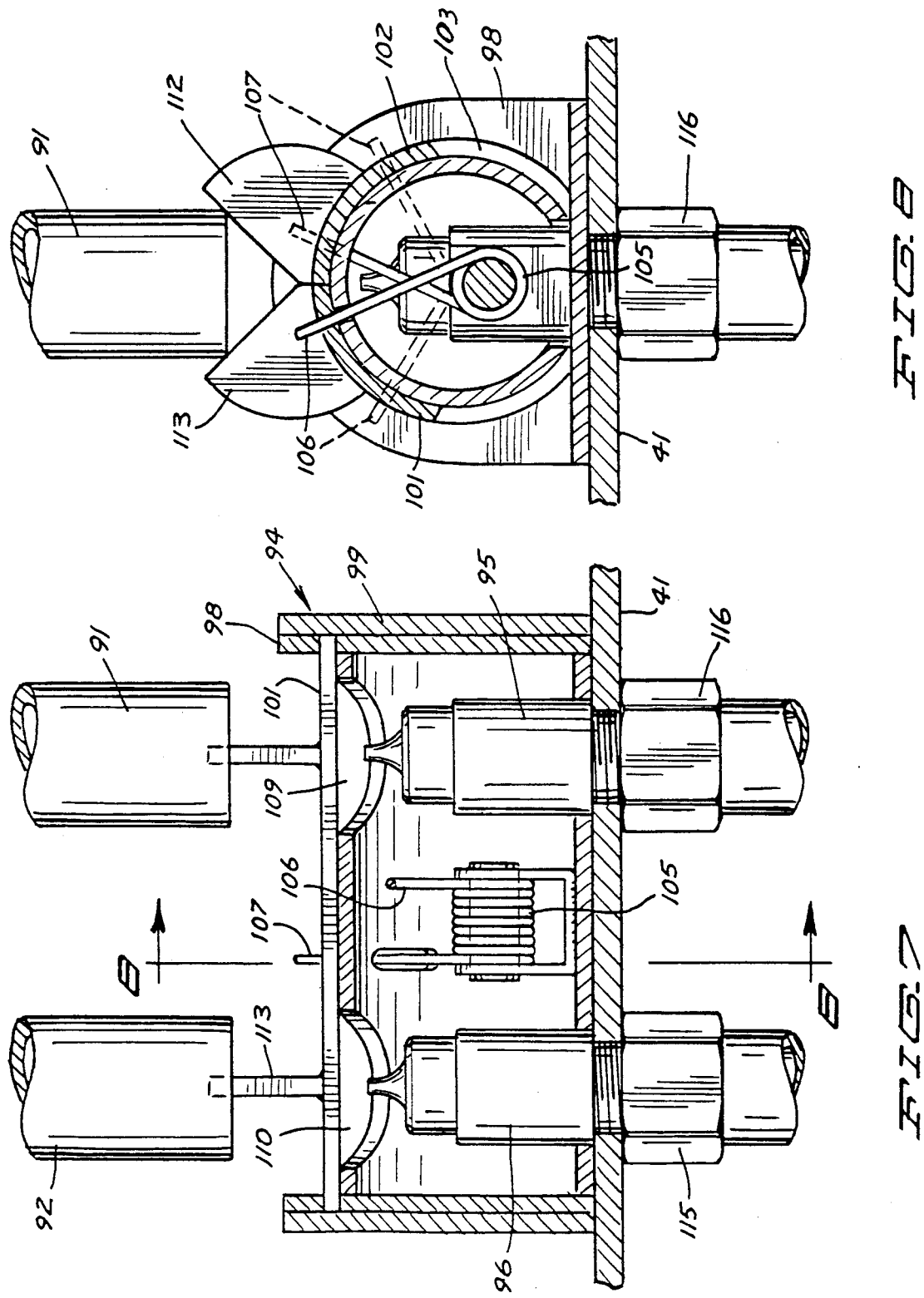

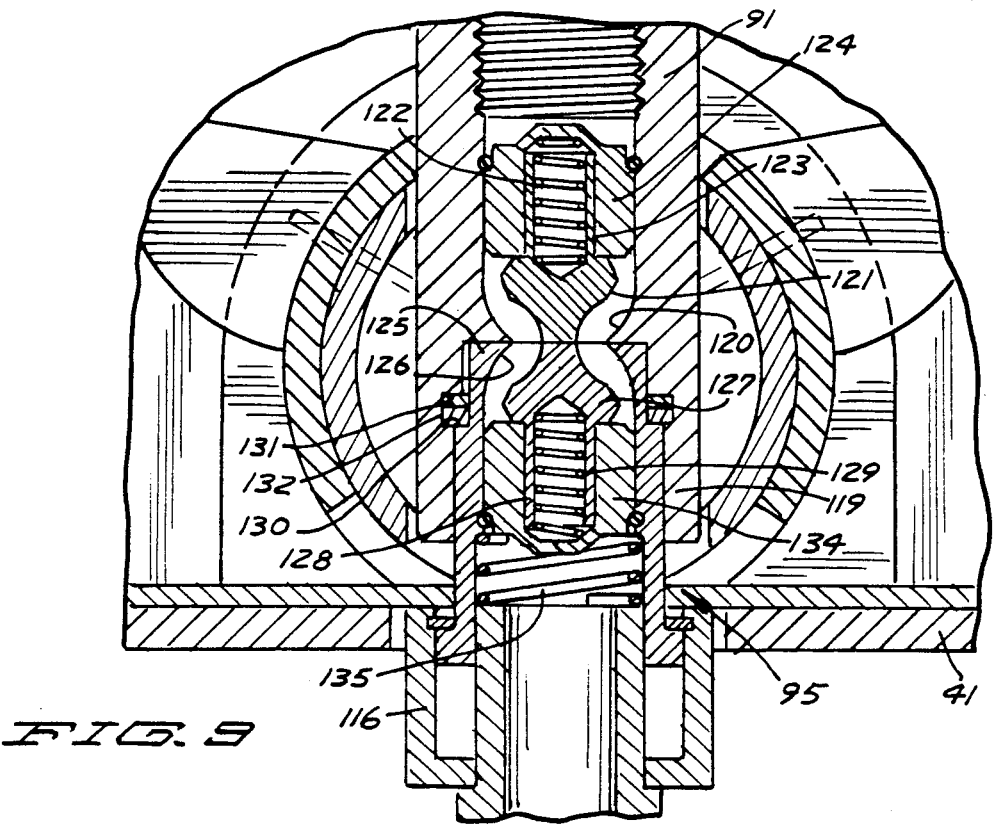
FIG. 9
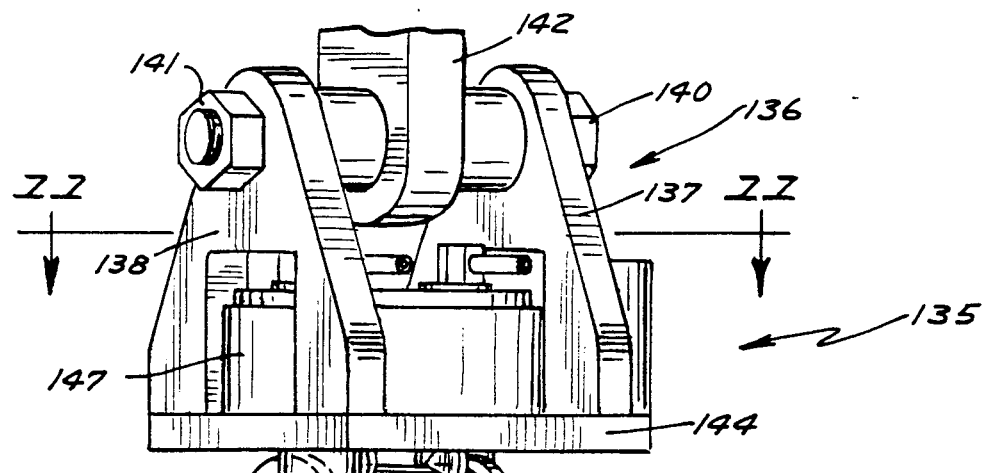
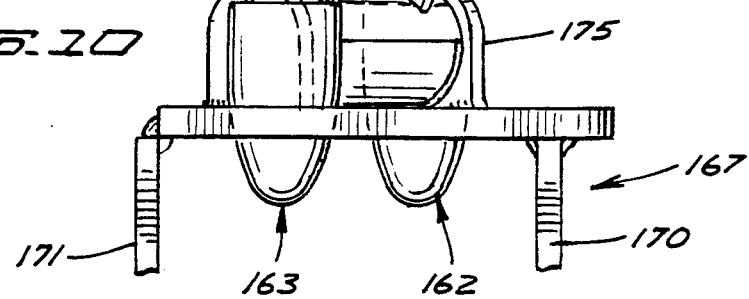
FIG. 10

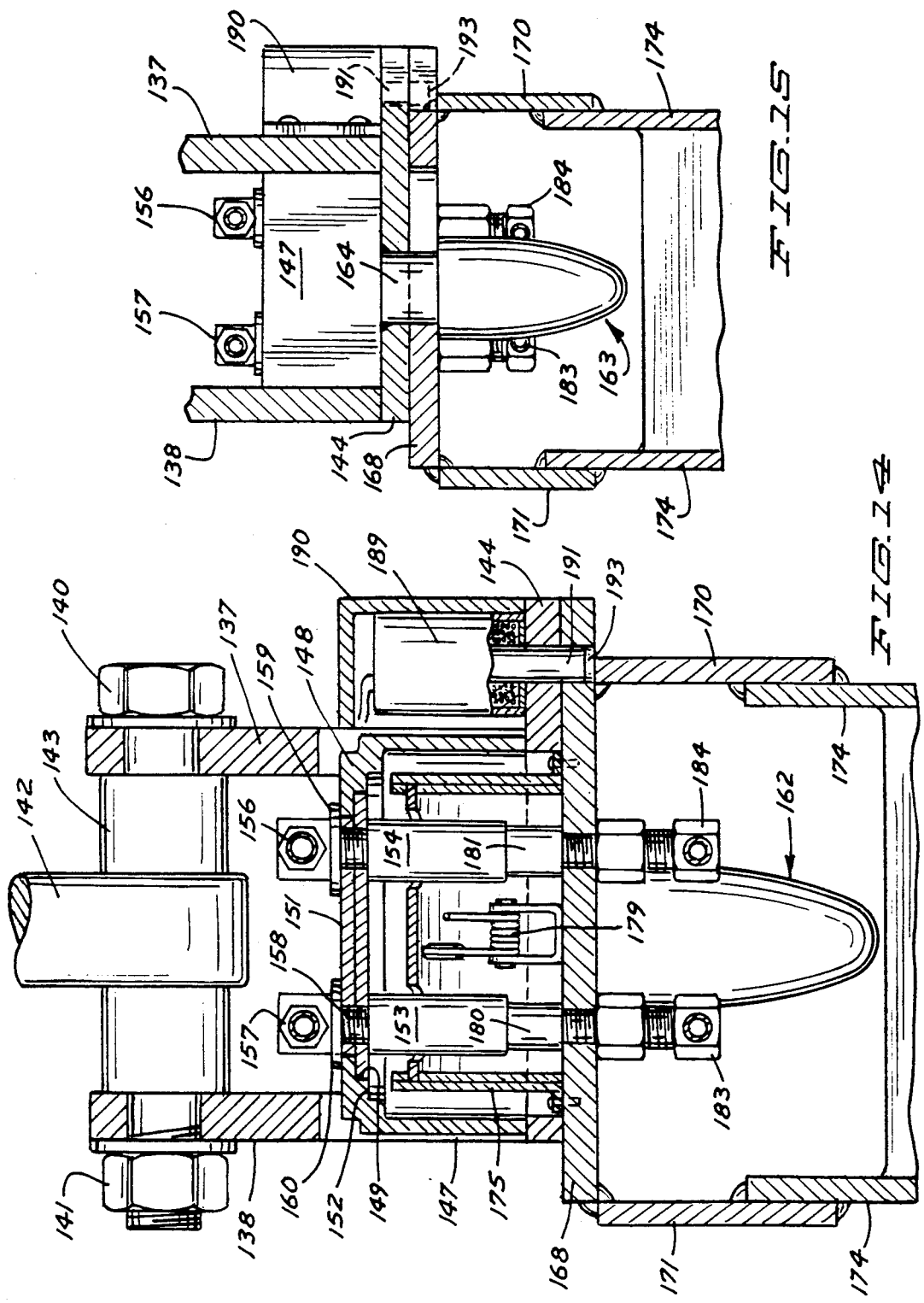

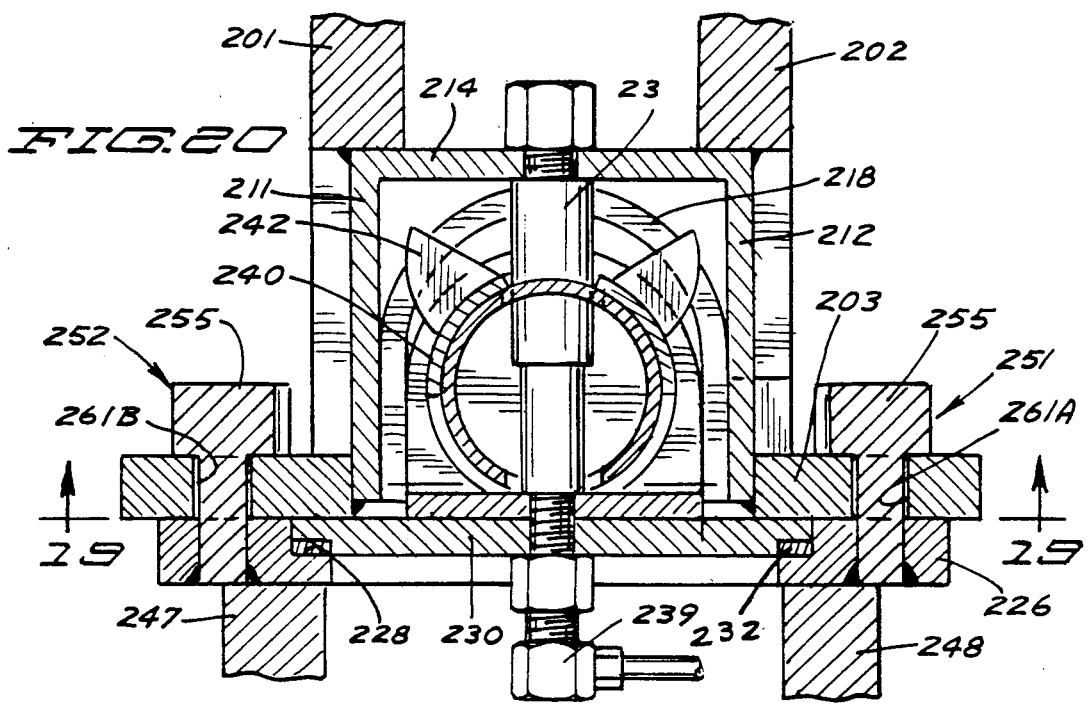
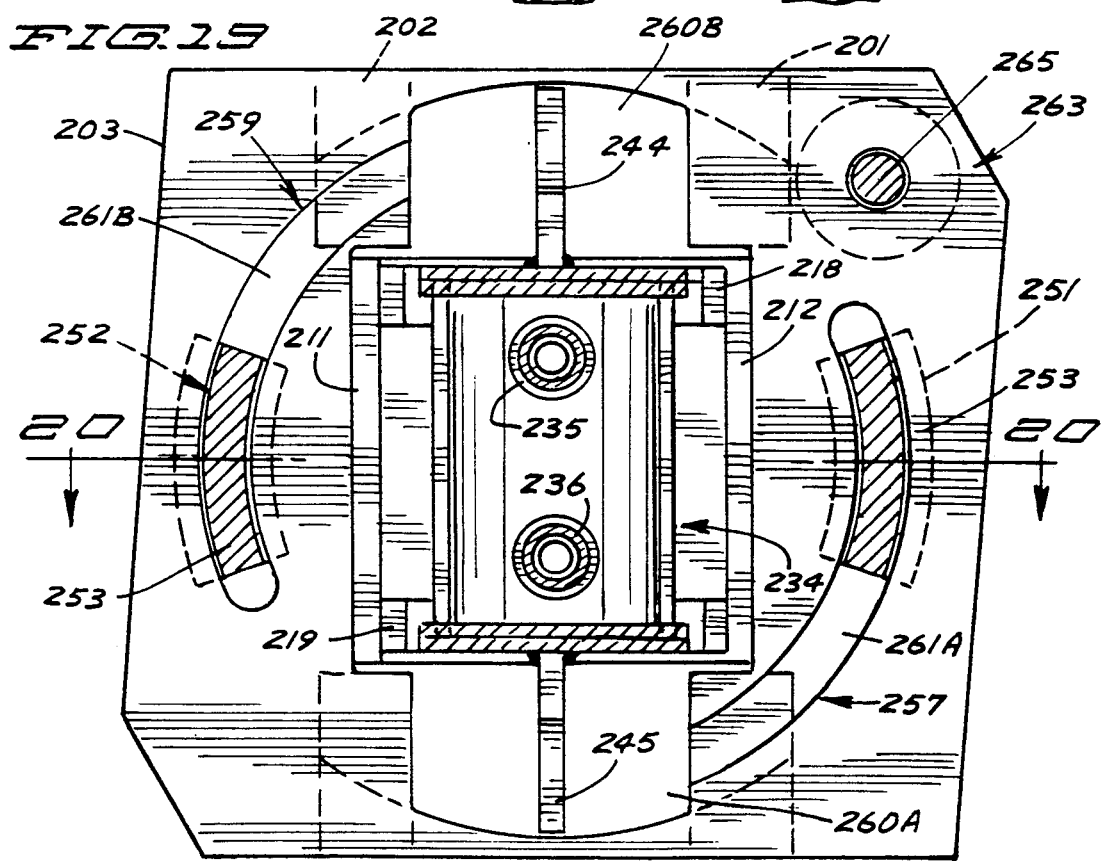

LOAD HANDLING APPARATUS WITH SEPARABLE LOAD COUPLING

BACKGROUND OF THE INVENTION

In the field of logging, felled trees and portions thereof are transported over unusually difficult terrain to a landing for further processing. Logging vehicles termed "skidders" are employed to drag loads of logs from the felled location to the destination. Alternative forms of skidders are available, but there are primarily two. One involves skidding with chokers and mainline, and the other involves grapple skidding. Each has definite advantages over the other for a given set of circumstances. The choker-mainline skidder involves connecting logs with a choker and dragging them over the terrain with a mainline. This method allows the operator, under adverse skidding conditions where driving and skidding together are difficult, to drop the drag, move the skidder ahead the full length of the mainline from the drag, then draw or winch the drag up to the skidder location. This is prudent when traversing soft ground, steep adverse grades, or the like. To operate the cable skidding system the operator dismounts the machine, pulls out the mainline chokers, hooks a choker to each tree to be skidded, mounts the skidder and operates the winch to draw the drag of trees to the transport position. At the landing destination, the operator releases the winch which allows the mainline and chokers to fall slack. He dismounts the skidder to unhook each individual choker from the tree stems, which might be all bunched together. The operator then remounts, draws the excess mainline and chokers into the machine and returns for another load.

Grapple skidding generally has distinct advantages over choker skidding particularly in terms of skidding production, operator safety and comfort. Grapple skidders are equipped with a grapple suspended from a boom. The grapple is usually hydraulically operated to open and close. In the open position the grapple is lowered with grapple tines opened to surround the end portions of a load of logs. The grapple is closed and then lifted to a position where the ends of the logs abut the rear end portion of the machine. The operator performs this procedure from the operator station of the machine. In terms of disadvantage, a portion of the weight of the drag is added to that of the vehicle. The vehicle with the drag is limited in its ability to transport the load under adverse terrain conditions. Maneuverability is limited and the added weight increases difficulty in soft terrain or muddy conditions. The grapple skidder must be of sufficient size with adequate horsepower to transport a maximum intended load over the most adverse terrain anticipated and therefore is generally oversized for ordinary skidding conditions.

SUMMARY OF THE INVENTION

The invention relates to a load handling apparatus such as a grapple assembly suspended from a boom type structure. The grapple assembly is also connected to a mainline that is connected to the tow vehicle. A releasable load coupling connects the grapple assembly to the boom structure. The grapple assembly is hydraulically actuated and hydraulically connected to the tow vehicle for that purpose. The load coupling detach and attach mechanism includes detachable mechanical and hydraulic connections operable by the skidder operator from the vehicle control station. The operator can engage and disengage a load in standard fashion for a grapple skidder and transport the load over the terrain in usual fashion. Upon encountering ground conditions too adverse to negotiate with the drag in tow, the operator can operate the machine as a choker-mainline type skidder. The operator lowers the grapple engaged load to the ground then detaches the grapple from the boom structure from the operating station of the vehicle. The mainline remains attached to the grapple. The operator moves the tow vehicle ahead, leaving the drag behind, while permitting the mainline to reel out. When the vehicle has traversed a distance beyond the adverse terrain, or when the mainline is fully extended, the operator stops the vehicle and engages the winch to pull the drag up to the vehicle. The operator can then move the vehicle forward again, or, if clear of the adverse terrain, can reattach the boom structure and the grapple assembly, then lift the grapple assembly and load to the transport position and resume operation as a grapple skidder.

The releasable load coupling between the grapple assembly and the boom structure can be retrofitted to existing machines. One segment of the mechanism is fixed to the grapple head and the other segment is fixed to the knuckle assembly usually associated with the boom structure. A power actuated latch mechanism mechanically connects the two segments. A quick disconnect hydraulic coupler connects the hydraulic lines of the grapple motor to the hydraulic supply of the tow vehicle. In one form of the invention, the latch mechanism takes the form of hook like members that are pivotally assembled to one segment of the load coupling and engage a plate connected to the other segment of the load coupling. In another form of the invention, mounting pins on the upper segment of the load coupling mate with openings on the lower segment. The segments join in a bayonet type connection by rotating the top segment with respect to the bottom segment to a point where circumferential slots on the mounting pins are in a locked position with respect to the keyhole type openings. In a third form, large headed key-type members on the lower segment pass through the enlarged portion of keyhole like openings on the upper segment and are rotated to be engaged in the narrow portion of the openings.

IN THE DRAWINGS

FIG. 3 is an enlarged end view of a portion of the grapple assembly of FIG. 1 taken along the line 3—3 thereof;

FIG. 4 is an enlarged side elevational view of one form of releasable load coupling of the load handling apparatus of FIG. 1 shown in an attached configuration;

FIG. 5 is an end elevational view of the load coupling of FIG. 4;

FIG. 6 is an assembly view of the load coupling of FIG. 4 shown in perspective with the first and second segments thereof detached from one another;

FIG. 7 is an enlarged view of the hydraulic coupling assembly of the load coupling of FIG. 4 showing the hydraulic connectors in an unattached configuration and partially in section for purposes of illustration;

FIG. 8 is a sectional view of a portion of the hydraulic coupling assembly of FIG. 7 taken along the line 8—8 thereof;

FIG. 9 is an enlarged view in section showing the male and female hydraulic connectors of the hydraulic coupling assembly in connected configuration with internal passages open to permit flow of hydraulic fluid;

FIG. 10 is a view in perspective of a second form of load coupling according to the invention showing the upper load coupling segment and part of the lower load coupling segment disconnected from but poised for connection with upper segment;

FIG. 14 is a sectional view of a portion of the load coupling apparatus shown in FIG. 13 taken along the line 14—14 thereof;

FIG. 15 is another sectional view of a portion of the load coupling apparatus shown in FIG. 13 taken along the line 15—15 thereof;

FIG. 19 is a sectional view of the load coupling like that of FIG. 18 but showing the upper and lower load coupling segments connected and rotated to a latching position;

FIG. 20 is a sectional view of a portion of the load coupling of FIG. 19 taken along the line 20—20 thereof.

DESCRIPTION OF PREFERRED EMBODIMENTS

Figure 1:
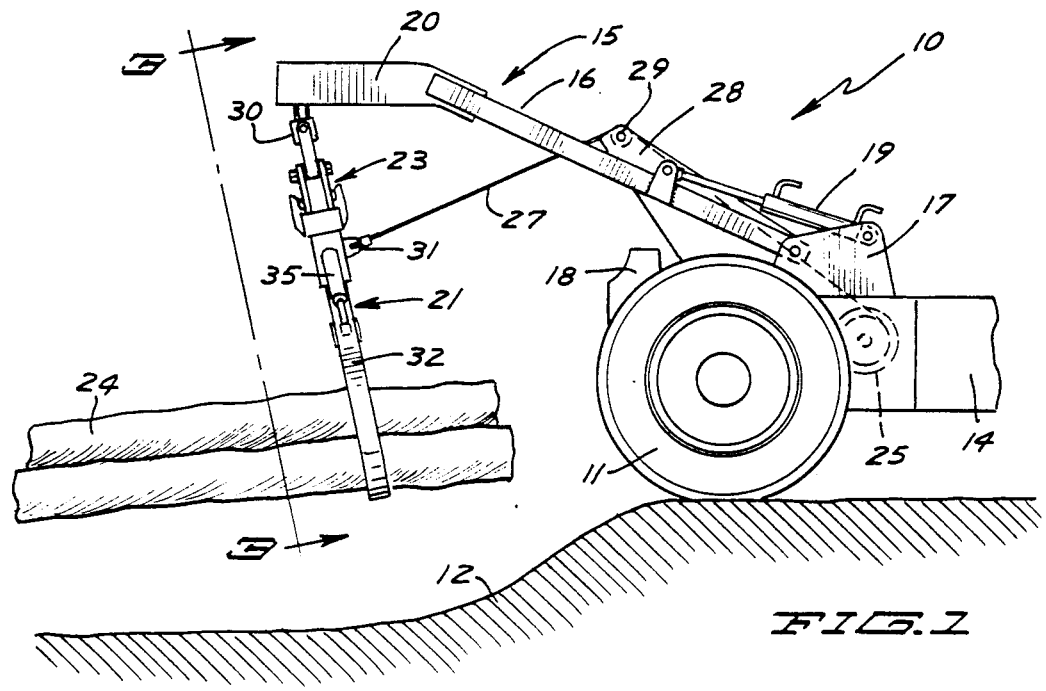
FIG. 1 is a side elevational view of a load handling apparatus of the invention showing the rear portion of a skidder vehicle and with a grapple assembly and grapple boom in engagement of a load.
Figure 2:
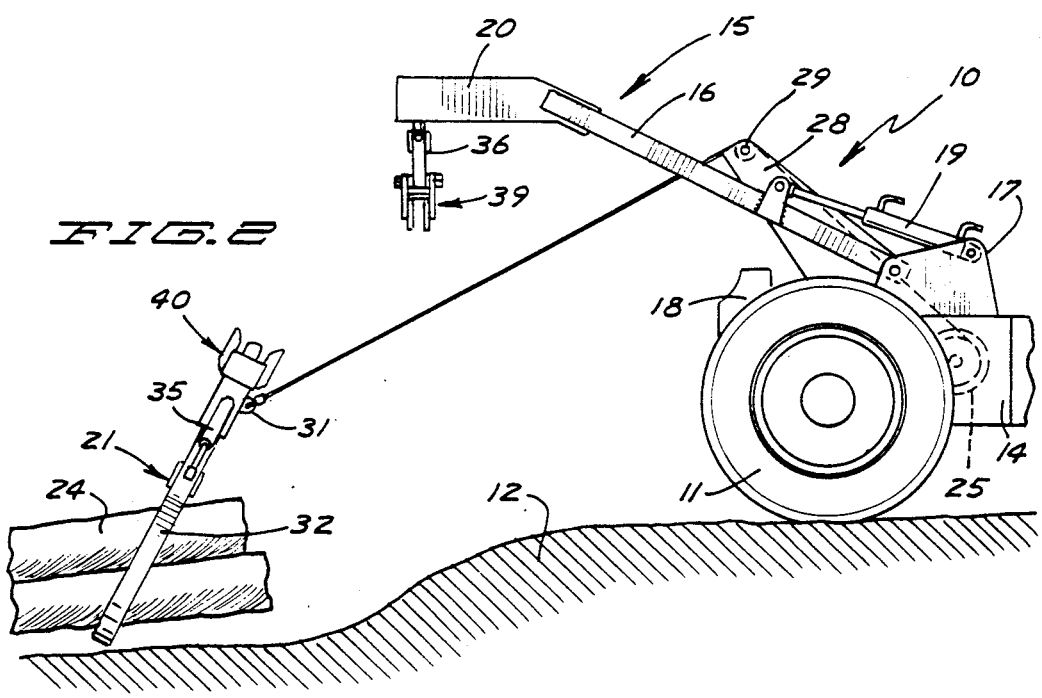
FIG. 2 is a side elevational view of the skidder, boom and grapple assembly with load of FIG. 1 but with the grapple assembly detached and removed from the boom, and the skidder vehicle moved ahead from FIG. 1.
Figure 11:
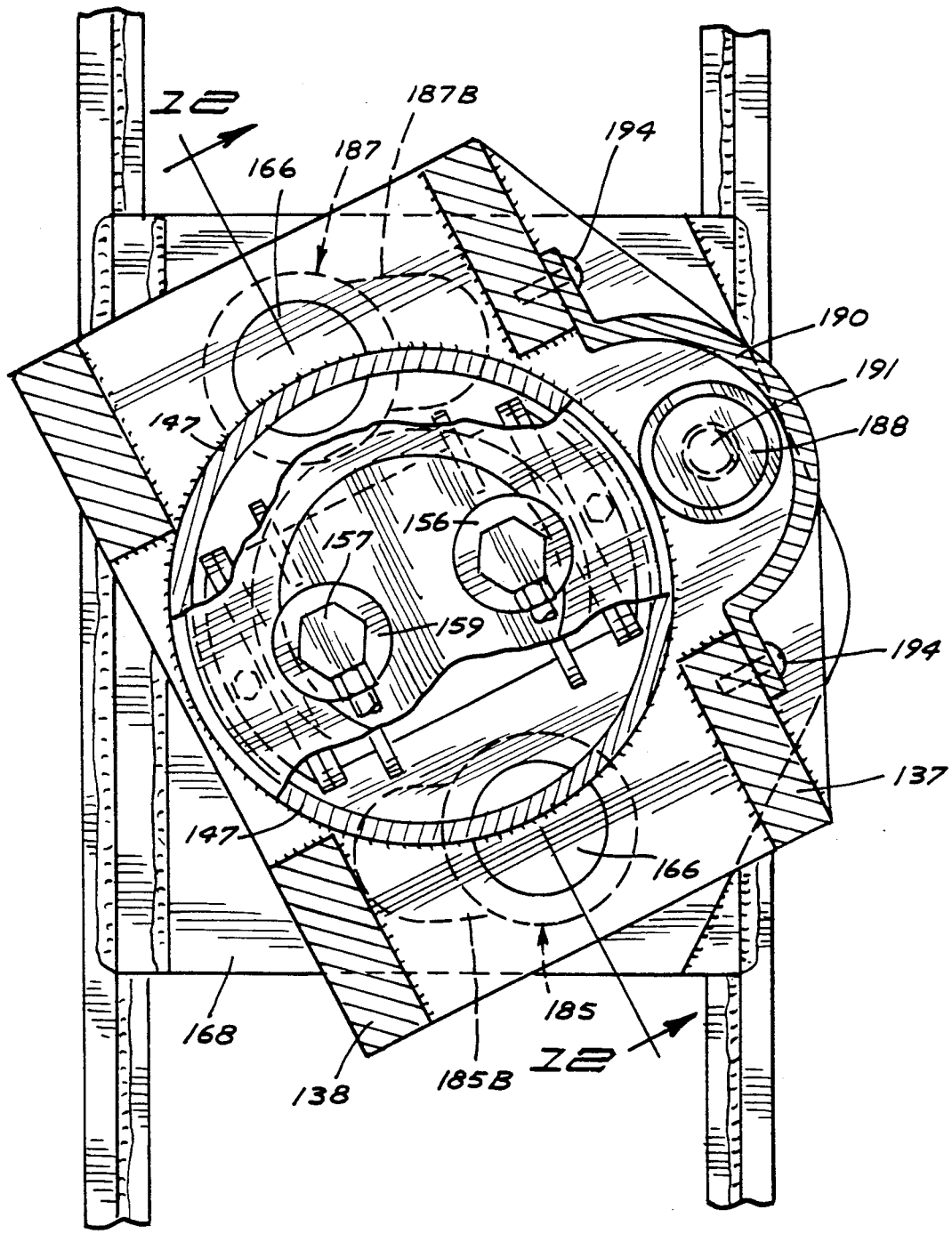
FIG. 11 is an enlarged view in section of a portion of the load coupling apparatus of FIG. 10 taken along the line 11—11 thereof.

Referring to the drawings, there is shown in FIGS. 1 and 2 the rearward end of a tow vehicle or log skidder 10 mounted on wheels 11 relative to a ground surface 12 which will typically be rough and irregular terrain with mud, running or standing water, slopes, gullies, ditches and the like. Vehicle 10 has a chassis 14 carrying an articulated boom assembly 15. Boom assembly 15 has arm structure 16 pivotally mounted on a bracket assembly 17 mounted to chassis 14, and extended rearwardly therefrom. Linear hydraulic motors 19 are connected between bracket assembly 17 and arm structure 16 and are effective to raise and lower the arm structure 16. A boom head 20 is connected to the outer end of the arm structure 16 and extends rearwardly therefrom.

As shown in FIGS. 1 through 3, a separable load carrying apparatus according to the invention suspended from the boom head 20 includes a grapple assembly 21 and a load coupling 23 according to one form of the invention. Grapple assembly 21 carries a drag or load 24 of logs. In FIG. 1 the load 24 is suspended from boom head 20 and positioned to be towed as suspended or to be brought up to rest against the butt 18 of chassis 12 to be towed thereon. In FIG. 2 the load and grapple assembly have been lowered to the ground surface 12 and released from the boom head 20 which has moved with vehicle 10 ahead a short distance.

A powered winch drum 25 is mounted on chassis 14 and carries a suitable length of mainline or winch line 27 usually comprised as either wire rope or chain. A fairlead 28 is mounted on chassis 14 in line with and rearward of winch drum 25. Fairlead 28 extends upward and rearward and carries a fairlead roller 29 proximate the extreme tip thereof. Mainline 27 extends from the winch drum 25 over the fairlead roller 29 to grapple assembly 21. An eye 31 is fastened to the grapple assembly 21. The free end of the main line 27 is secured to the eye 31.

Grapple assembly 21 is conventional, as shown in FIG. 3, having tines 32 pivoted to a grapple head frame 33 and pivotal between an open position and a closed position to engage the load 24. Tines 32 are powered by linear hydraulic motors 35 of the rod and cylinder variety. Hydraulic motors 35 are controlled from the control station of vehicle 10 from where they derive a supply of hydraulic fluid.

A universal joint or knuckle 36 depends from boom head 20 and is attached to load coupling 23 permitting both swinging and rotation of grapple assembly 21. Knuckle 36 includes a generally downwardly depending knuckle bar 37 as shown in FIG. 3. The knuckle bar 37 is pivotally connected to the load coupling 23 to permit swinging about an axis perpendicular to the plane of FIG. 3. The knuckle 36 can be free to swivel with respect to the boom head 20 or it can be rotatably powered through a rotation mechanism of the type disclosed in U.S. Pat. No. 4,315,652 to Barwise issued Feb. 16, 1982 and incorporated herewith by reference. In the apparatus of that patent a rotator mechanism located in the boom head suspends the knuckle and allows selective powered rotation of the knuckle for angular orientation of the grapple assembly.

Load coupling 23 includes a mechanical latch assembly to releasably attach the grapple assembly 21 to the knuckle 36, and a hydraulic interconnect or coupling to releasably connect hydraulic lines between the grapple assembly motors 35 and the hydraulic fluid supply located on the vehicle 10 (not shown). Load coupling 23 has interconnectable segments, one attached to the knuckle 37 and accordingly the boom head 20, and the other attached to the grapple head frame 33 and grapple assembly 21.

Load coupling 23 is shown in enlarged view in FIGS. 4 through 9 with the latch components emphasized in FIGS. 4 through 6 and the hydraulic coupling emphasized in FIGS. 7 through 9. The first and second segments of load coupling 23 are shown separated in FIG. 6 and connected in FIGS. 4 and 5. An upper segment 39 of load coupling 23 is connected to the knuckle bar 37. A lower segment 40 has a latch plate 41 that is connected to or integral with the grapple head frame 33. Latch plate support plates 41A, 41B are connected to latch plate 41 and connected to head frame 33 as by welding.

The upper load coupling segment 39 includes a frame having a pair of parallel spaced apart side plates 43, 44. Side plates 43, 44 are connected by pivot means including a bolt 45 passing through suitable openings provided in the upper portion of plates 43, 44 and secured by a nut 47. Knuckle bar 37 is pivotally connected to the bolt 45. Spacers 48 are located on bolt 45 between the knuckle bar 37 and the facing surfaces of the plates 43, 44.

Side plates 43, 44 carry pivotal latch members for engagement with latch plate 41. A first latch pivot includes a latch pivot bolt 50 secured by a nut 51 and positioned in aligned openings in side plates 43, 44 located toward one edge thereof. A second latch pivot bolt 52 secured by a nut 53 is located symetrically opposite the first latch pivot 50. First latch pivot 50 carries a first pair of latch members 55, 56. Second latch pivot 52 carries a second like pair of latch members 57, 58. As shown in FIG. 6 typical latch member 56 includes a lower arm 61 terminating in an inwardly directed hook. An enlarged mid-portion 62 has an opening to accomodate the latch pivot bolt 50. An upper arm 63 extends upwardly from the mid-portion 62 opposite the lower arm 61. A first connecting bar 65 connects the upper arms 63 of the first and second latch members 55, 56. A second connecting bar 60 (FIG. 4) connects the upper arms of the third and fourth latch members 57, 58 of the second pair of latch members. Latch member connecting bars 65, 60 are connected to each other by a linear hydraulic motor comprised of a cylinder 68 and a reciprocating rod 69 as best shown in phantom in FIG. 4. Hydraulic fluid lines 70 extend to the cylinder 68 for reciprocal movement of the rod 69. The outboard end of rod 69 is connected to the first latch member connecting bar 65. The opposite end of cylinder 68 is connected to the second latch member connecting bar 60. Extension and retraction of the rod 69 with respect to the cylinder 68 results in relative back and forth or opening and closing movement of the hooks of the first and second pairs of latch members. The hooks are spaced apart generally a distance corresponding to the width of the latch plate 41. In the retracted position of the rod 69, the spacing between the hooks exceeds the width of the latch plate 41. Extension of the rod 69 closes the hooks of the latch members to enable them to close upon first and second opposite edges of latch plate 41 as shown in FIGS. 4 and 5. The hooks engage the lower surface portion of the latch plate 41. The bottom edges of the side plates 43, 44 engage the top surface of the latch plate 41 to secure the upper and lower segments 39, 40 of the load coupling 23.

Side plates 43, 44 of upper segment 39 have legs 73, 74 defining downwardly facing central openings 72. Openings 72 in side plates 43, 44 are connected by side walls 76, 77 and a top wall forming an upper hydraulic connector housing.

Four upright guide posts 80-83 are located on the upper surface of latch plate 41 to facilitate proper connection of the hydraulic interconnect components of load coupling 23. Guide posts 80-83 are positioned to be straddled by legs 73-74 of side plates 43, 44. Pillars 85, 86 are fixed to one edge of latch plate 41 spaced from a pair of guide posts 80, 82 a distance corresponding to the width of the legs 73, 74 of side plates 43. The pillars 85, 86 have a front face in facing relationship to the posts 80, 82 and a rib connected to the front face and latch plate 41. The pillars are shown in FIGS. 5 and 6 but omitted from FIG. 4 for purposes of clarity. Pillars 85, 86 are intended to be facing the machine operator to provide visual alignment as the upper and lower segments 39, 40 of load coupling 23 come together.

In use of the latch mechanism of load coupling 23, the connected upper and lower segments 39, 40 are disengaged by operation of hydraulic motor 68 to retract rod 69. The hook portions of the latch arms open to a point of disengagement with the latch plate 41. Upper segment 39 is moved away from the lower 40 segment upon raising knuckle 37. Upon recoupling the upper segment 39 is lowered over the lower segment 40 with the latch hooks spread. The side plate legs 73, 74 straddle guide posts 80-83. The legs of one side plate 43 fit between the pillars 85, 86 and corresponding guide posts 80, 82. Upon contact of the side plate legs 73, 74 with the upper surface of the latch plate 41, the hooks 61 of the latch members 55-58 are poised beneath the bottom of latch plate 41. Actuation of the hydraulic motor 68 to close the hooks engages the bottom surface of the latch plate 41. Grapple assembly 21 can be lifted with the knuckle bar 37 while engaging the load 24.

Releasable hydraulic interconnect components are carried by the upper and lower segments 39, 40 of load coupling 23 to connect the grapple tine motors 35 to the hydraulic fluid source located on the vehicle 10. Hydraulic lines 87, 88 (FIGS. 4-6) extend from the hydraulic fluid source (not shown) conventionally found on the skidder vehicle, to the upper segment 39 of load coupling 23. A pair of hydraulic fittings 90 (FIGS. 4) are installed on the upper surface of the top wall 78. First and second female hydraulic connectors 91, 92 are connected to the fittings 90 on the lower surface of top wall 78 (FIG. 7).

A truncated cylindrical housing 94 is shown in FIG. 6 and in section in FIGS. 7 and 8, installed on the upper surface of latch plate 41 positioned between the guide posts 80-83 and beneath the intended or projected path of travel of the female hydraulic connectors 91, 92 as they are brought into latching relationship. Housing 94 contains male hydraulic connectors 95, 96. Housing 94 has outer end walls 98 positioned adjacent inner end walls 99. Curved sliding doors 101, 102 open and close over the male connectors 95, 96. The doors 101, 102 are uniformly curved and have edges that ride in correspondingly curved arcuate grooves 103 which are formed on the facing surfaces of the inside walls 98. Doors 101, 102 slide to an open position to expose circular top openings 109, 110 in the housing 94 of sufficient dimension for entry of the lower ends of the female connectors 91, 92 (FIG. 7). The doors 101, 102 are normally biased in the closed position by a coil spring 105 positioned in the housing 94. Spring 105 is helical and has outwardly extended arms 106, 107 engaged in suitably provided openings in the doors 101, 102. Upon opening of the doors 101, 102 the arms 106, 107 are spread against the bias of the spring 105 as shown in phantom in FIG. 8.

Each door has a pair of wing-like opening members 112, 113. In the closed position of doors 101, 102, wing members of opposite doors are positioned together to form V-shaped receptacles, one each poised in the projected path of movement of each of the female hydraulic connectors 91, 92. Upon contact of the tips of the connectors 91, 92 with a pair of wing members 112, 113, the members spread apart as shown in phantom in FIG.

8. The doors 101, 102 open for access to the interior of housing 94 by the female hydraulic connectors 91, 92. Upon further movement into the housing 94, the connectors 91, 92 engage the male hydraulic connectors 95, 96.

Male connectors 95, 96 are installed in suitable openings in latch plate 41. As shown in FIG. 7, fittings 115, 116 connect to the connectors 95, 96 on the lower surface of latch plate 41. Suitable hydraulic lines 117 extend from the fittings 115, 116 to the grapple assembly motors 35.

The hydraulic connectors are shown in connected relationship in FIG. 9 and are similar to those shown and described in U.S. patent application Ser. No. 492,494 of Robert D. Barwise filed Mar. 12, 1990. Male and female connectors both have spring loaded poppets which are closed against valve seats when the connector is unattached. When connected, the poppets are mutually retracted from the valve seats against poppet springs to open the hydraulic fluid passage between the connectors. As shown in FIG. 9, female connector 91 has an end 119 with a sleeve like opening. A valve seat 120 is recessed in the end 119. A poppet 121 is loaded by a poppet compression spring 122. The poppet 121 has a head that is shaped to seal in the seat 120 under the influence of poppet spring 122 when connector 91 is uncoupled. Poppet spring 122 bears against a poppet seat 124 installed in connector 91. The poppet has a tubular neck 123 installed in a corresponding opening in the seat 124. Poppet spring 122 is installed in the tubular neck of poppet 121 and biases the poppet 121 toward the valve seat 120.

Male hydraulic connector 95 has a tubular nose portion 125 of a diameter to closely fit within the opening of the end 119 of female connector 91. The end of nose 125 has an interior valve seat 126. A poppet 127 has a head movable into and out of sealing relationship with the valve seat 126. The poppet 127 has a neck 128 which is installed in a guide opening in poppet seat 134. A poppet spring 129 bears between the seat 134 and the poppet 127 to bias it towards engagement with the valve seat 126. The poppet seat 134 bears against a main spring 135 fixed in the body of the male connector 95. Nose 125 has an exterior shoulder 130. An internal shoulder 131 is located in the sleeve opening of end 119 of female connector 91. The shoulders 130, 131 are separated by a seal means 132 when the connectors are coupled.

In the coupled relationship of the male and female connectors as shown in FIG. 9, the tips of the poppets 121, 127 bear against one another and are mutually retracted and main spring 135 is deflected. The poppets are moved away from the valve seats 120, 126 to open a passageway between them and permit the flow of hydraulic fluid therefrom through internal passages (not shown). During operation of the grapple assembly, a certain amount of movement occurs which would normally tend to pull the connectors apart. Main spring 135 has a spring constant greater than that of the poppet springs 122, 129. Relative movement between the upper and lower portions of the load coupling 23 is taken up by the main spring 135. Such movement is apt to occur as a result of clearances or wear as between the upper and lower portions 39, 40 of load coupling 23.

In operation of the hydraulic connectors, the upper and lower segments 39, 40 of load coupler 23 are brought together as previously described. The guides 80-83 along with pillars 85, 86 precisely guide the upper segment 39 with respect to the lower segment 40. This correctly aligns the end portions 119 of the female hydraulic connectors 91, 92 with the wing members 112, 113 on the housing 94. As the upper and lower segments come together, the ends of the female hydraulic connectors 91, 92 bear against the V-shaped receptacles formed by the wing members 112, 113 and move them apart to open the doors 101, 102. Further movement results in the nose portions 125 of the male connectors 95, 96 being installed in the sleeve-like ends 119 of the female connectors 91, 92. The procedure is accomplished remotely by the machinery operator from the vehicle cab.

Figure 12:
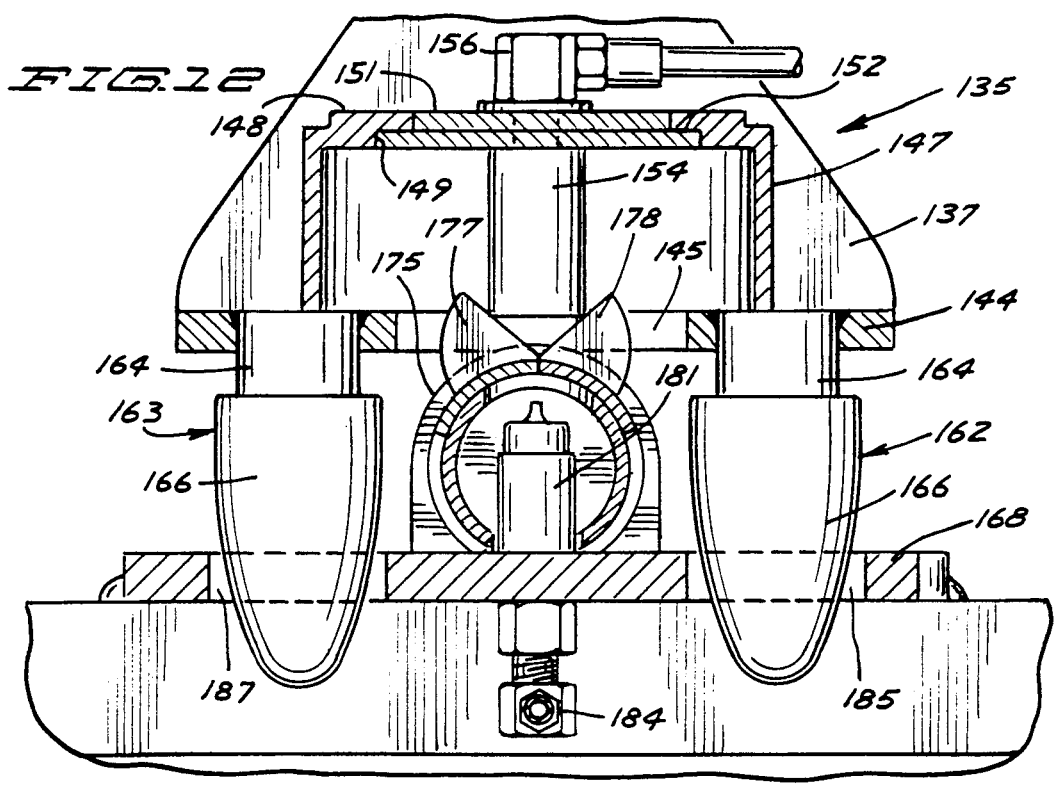
FIG. 12 is a sectional view of a portion of the load coupling apparatus of FIG. 11 taken along the line 12—12 thereof showing the upper and lower load coupling segments separated but poised for connection.
Figure 13:
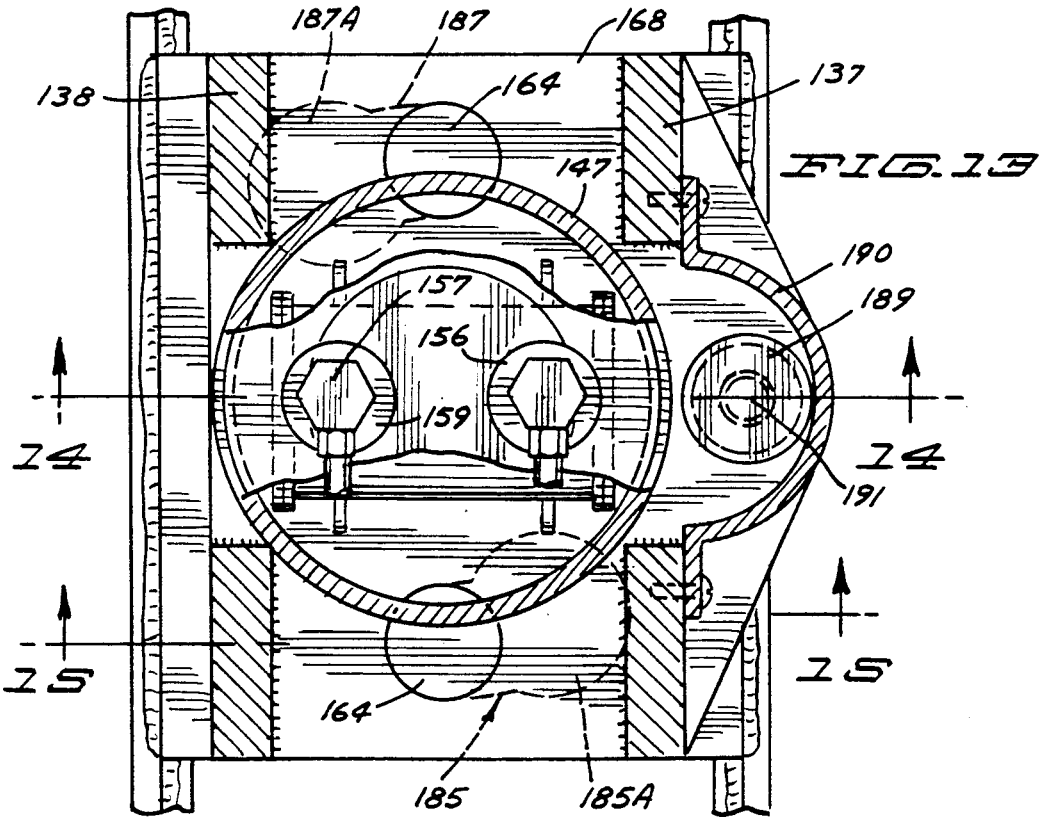
FIG. 13 is a top plan view in section like that of FIG. 11 but showing the upper and lower load coupling segments connected and rotated to the latching position.

A second form of load coupling indicated generally at 135 is shown in FIGS. 10 through 15. An upper load coupling segment 136 has side plates 137, 138 having upwardly convergent edges and joined by a pin or bolt 140 secured by a nut 141. A sleeve 143 surrounds the bolt 140 between side plates 137, 138. The lower end of a rotator powered knuckle 142 pivotally engages the sleeve 143 to permit pivotal movement about an axis parallel to the bolt 140. The lower edges of side plates 137, 138 are connected to a base plate 144 having a central access opening 145 (FIG. 12). An upper hydraulic connector mounting housing has an upright cylindrical side wall 147 mounted on the upper surface of base plate 144 surrounding the opening 145. A lip 148 extends radially inward from the upper edge of side wall 147 defining an upper opening to side wall 147. The lip 148 has a downwardly facing annular step 149. A mounting plate 151 is mounted in the top opening of side wall 147 defined by lip 147 and has an upwardly facing step 152 in mating relationship with the step 149 of lip 148. Mounting plate 151 carries downwardly directed female hydraulic connectors 153, 154. Hydraulic fittings 156, 157 are located on the upper surface of mounting plate 151. Threaded neck portions 158 extend through suitable openings provided in plate 151 and into the female hydraulic connectors 153, 154. Washers 159, 160 surround the necks 158 and support hydraulic fittings 156, 157 on the upper surface of support plate 151. Washers 159, 160 are of a sufficient diameter to overlap the edges of the lip 148 of side wall 147. Mounting plate 151 is assembled loose in the opening of side wall 147 and is supported by the washers 159, 160 such that the mounting plate 151 is rotatable in sliding fashion about a vertical axis relative to the side wall 147.

First and second mounting pins 162, 163 extend downwardly from base plate 144. Each mounting pin has a neck 164 connected to base plate 144 by suitable means such as welding. A downwardly orientated bullet shaped head 166 extends from the lower end of the neck 164. Head 166 has a diameter greater than that of the neck 164 at their juncture.

A lower load coupling segment 167 has a latch plate 168. Downwardly extended side walls 170, 171 are connected to opposite edges of latch plate 168. The lower ends of the side walls 170, 171 are connected to side walls 174 of the grapple head frame (FIGS. 14 and 15).

A lower connector housing 175 is mounted centrally on latch plate 168 of lower load coupling segment 167 and is constructed in accordance with the embodiment shown with respect to FIGS. 4 through 8. The housing 175 has sliding covers movable upon contact of wing-type members 177, 178 with lower ends of female hydraulic connectors 153, 154 of the upper load coupling segment. The sliding covers are biased closed by a spring 179. Second hydraulic connectors comprised as male connectors 180, 181 are located in housing 175. Hydraulic fittings 183, 184 located on the lower surface of latch plate 168 secure the male connectors in place and are connectable to hydraulic lines leading to the hydraulic motor to operate grapple tines. First and second keyhole type mounting openings 185, 187 (FIGS. 11-13) are formed in latch plate 168 on opposite sides of connector housing 175 for receipt of the mounting pins 162, 163. Each mounting opening has an enlarged circular portion 185A, 187A and a connected smaller slot portion 185B, 187B. The enlarged portions are of sufficient diameter for passage of the head portions 166 or the mounting pins 162, 163. The slot portions are of a dimension to accommodate the necks 164 of mounting pins 162, 163 but are too small for passage of the heads 166. The mounting openings are spaced apart according to the spacing of the mounting pins 162, 163. The mounting openings are positioned for insertion of the mounting pin heads 166 through the enlarged openings 185A, 187A to a position with heads 166 located on the opposite side of the latch plate 168 and the necks 164 positioned in the mounting openings. From this position the upper load coupling segment is rotatable so that the necks 164 move into the slot portions 185B, 187B.

A lock mechanism includes a solenoid assembly 189 (FIG. 11) located in a solenoid housing 190 installed on base plate 144 of upper coupling segment 136 and secured to a side plate 137 by bolts 194. A spring loaded solenoid plunger 191 is downwardly extendable from the solenoid housing 190 and retractable by operation of a remote electrical control located in the grapple skidder cab. A plunger opening 193 is located in latch plate 168 of the lower coupling segment 167. When the base plate 144 of the upper coupling segment 136 and the latch plate 168 of the lower coupling segment 167 are in proper alignment, the solenoid plunger 191 is poised over the solenoid plunger opening 193. Spring action downwardly extends the plunger 191 into engagement of the opening 193 to lock the upper and lower load coupling segments together.

In the use of the load coupling 135 to connect the grapple boom to the grapple assembly, the upper coupling segment 136 is poised over the lower coupling segment 167 by the grapple skidder operator. The operator actuates the rotator mechanism on the boom to rotate the upper segment 136 relative to the lower segment 167 to position mounting pins 162, 163 over the enlarged portions 185A, 187A of the mounting openings 185, 187. The operator lowers the upper coupling segment 135 onto the lower coupling segment 137. The female hydraulic connectors 153, 154 engage the winglike members 177, 178 on the cover of the lower connector housing 175 to open the cover whereby connection is made with the male hydraulic couplers 180, 181 as previously described with respect to the embodiment shown in FIG. 9. At the same time, the mounting pins 162, 163 pass through the enlarged portions of the mounting openings 185, 187 and the necks 164 are located in the openings. The operator operates the rotator mechanism to rotate the upper coupling segment 136 in a direction clockwise from the position shown in FIG. 11 to the position shown in FIG. 12. The necks 164 move into the slot portions 185B, 187B of the mounting openings. The head portions 166 are captured therein by the lower surface of the latch plate 168. Upon rotation of the upper coupling segment 136 with respect to the lower coupling segment 167 the female hydraulic connectors are held stationary with respect to the lower coupling segment 167. The mounting plate 151 slides and rotates about a vertical axis with respect to the upper connecting housing side wall 147. The solenoid plunger 191 moves downwardly into engagement with the solenoid opening 193 to lock the base plate 144 in position with respect to the latch plate 168. The reverse procedure uncouples the load coupler 135 to release the grapple assembly from the grapple skidder.

Figure 16:
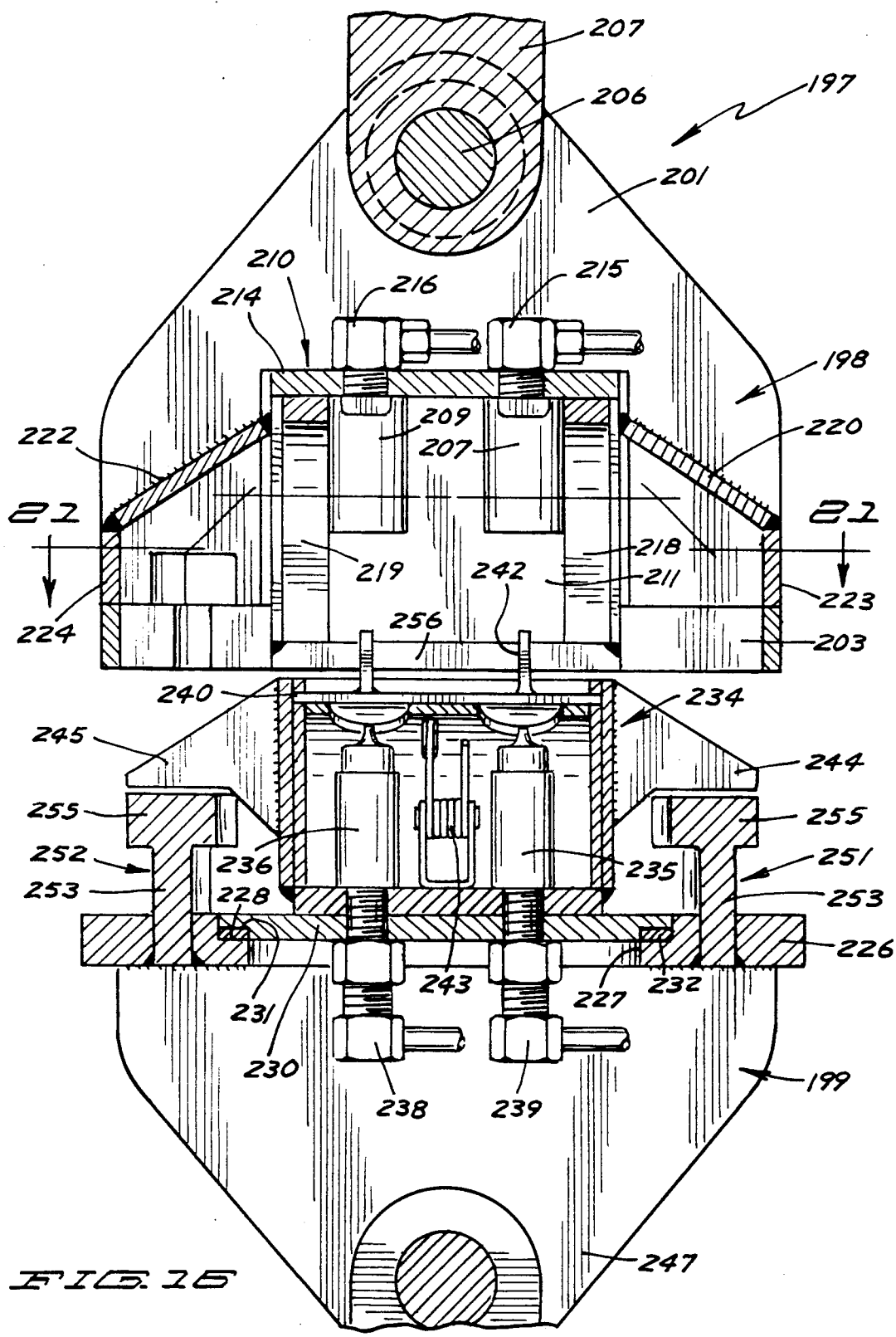
FIG. 16 is a side elevational view of a third form of load coupling according to the invention showing the upper and lower load coupling segments separated but poised for connection and partly in section for purposes of illustration.

A third form of load coupling is shown in FIGS. 16 through 21 indicated generally at 197 in FIG. 16. Load coupling 197 has an upper segment 198 interconnectable with a lower segment 199 through mounting pins of the type having a narrow neck and a relatively enlarged head which are inserted through keyhole type mounting openings and rotated to a locking position. The upper load coupling segment 198 has side plates 201, 202 connected to a base plate 203 at lower edges thereof. The side plates 201, 202 are constructed like the side plates 137, 138 of the load coupling assembly earlier described. The side plates have upwardly convergent edges that are connected to a pivot bolt 206 which is in turn connected to a knuckle 207.

Base plate 203 carries mounting structure for mounting upper hydraulic female connectors 207, 209. An upper connector housing 210 includes parallel spaced apart side walls 211, 212. A top wall 214 spans the upper edges of the side walls 211, 212. The upper hydraulic connectors 207, 209 are secured to the top wall 214 by hydraulic fittings 215, 216. Arch shaped support members 218, 219 (FIG. 19) are located at the open ends of housing 210 spanning the distance between the side walls 211, 212.

First and second retaining plates 220, 222 are fastened between edges of side walls 211, 212 at opposite ends thereof and extend outwardly and angularly downward to a location over edges of base plate 203. Retaining walls 223, 224 extend downward from the outer edges of retaining plates 220, 222 to the edge of base plate 203.

Lower load coupling segment 199 has a latch plate 226 with a circular central opening 227 having an upwardly facing peripheral step 228. A washer 232 of low friction material such as Teflon material is located on the step 228 of top plate 226. A mounting plate 230 is installed in the central opening 227 and has a downwardly facing step 231 situated on the washer 232. The mounting plate 230 is rotatable in the central opening 227 with respect to the latch plate 226 on washer 232.

A truncated-cylindrical lower connector housing 234 is mounted on mounting plate 230 and carries male hydraulic connectors 235, 236 having threaded lower end portions extending through suitable openings provided in mounting plate 230 and connected to lower hydraulic fittings 238, 239 on the opposite surface of the mounting plate 230. The lower connector housing 234 has cover members 240 which are slidable to open and close, and are actuated by wing type members 242 movable upon contact with the upper connectors 207, 209 and normally biased in a closed position by a spring 243. Connector housing 234 in the connectors and associated mechanism are constructed in the same fashion as earlier described. The outer dimension of the connector housing 234 corresponds to the interior dimension of the arch members 218, 219 on the upper load coupling segment 198 so that the housing 234 will fit within the arch members 218, 219 when the upper and lower load coupling segments are assembled. Retaining members 244, 245 extend outward from the end walls of the lower connector housing 234 and have inclined upper edges that correspond in inclination to the retaining walls 220, 222 located on the upper load coupling segment 198. Retaining members 224, 225 are shaped to be disposed in close relationship beneath retaining walls 220, 221 when the upper and lower load coupling segments are assembled.

Lower load coupling segment side plates 247, 248 are connected to and extend downwardly from latch plate 226 of lower load coupling segment 199 for connection to suitable structure associated with the grapple assembly (not shown).

Figure 18:
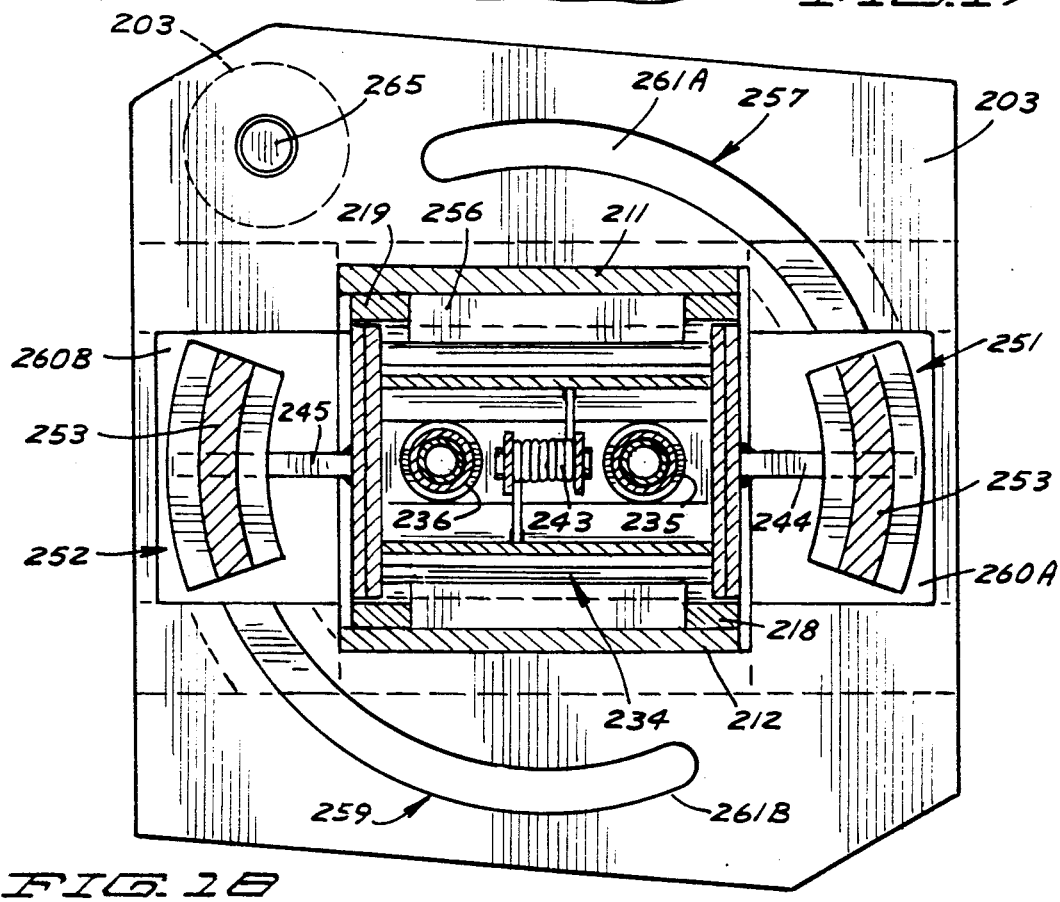
FIG. 18 is a sectional view of a portion of the load coupling of FIG. 17 taken along the line 18—18 thereof.
Figure 21:
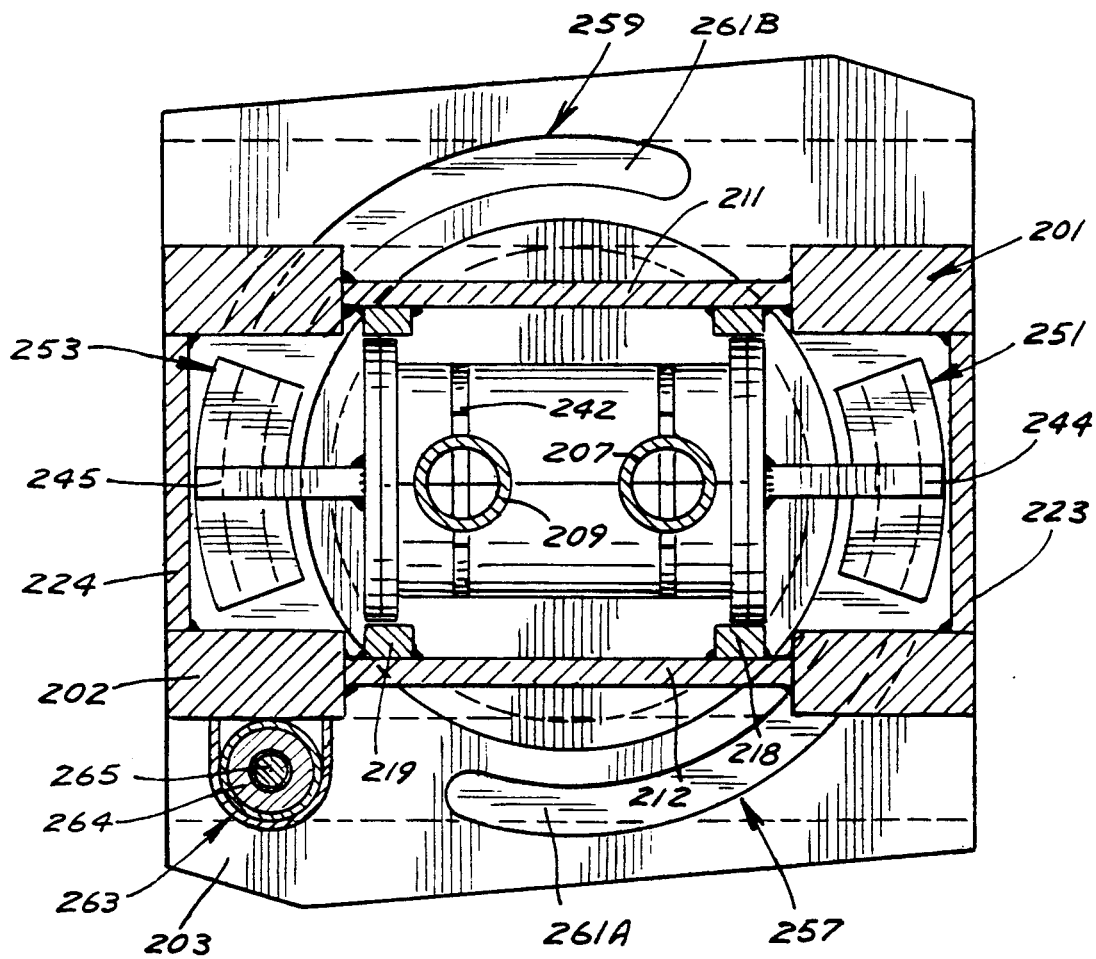
FIG. 21 is a sectional view of a portion of the load coupling shown in FIG. 16 taken along the line 21—21 thereof.

T-shaped mounting pins 251, 252 are fastened to latch plate 226 toward the peripheral edge thereof and are positioned in diametrically opposite relationship relative to mounting plate 230. Each mounting pin has a neck 253 extending upward from the latch plate 226 and an enlarged head 255 at the top of the neck 253. Both neck 253 and head 255 are rectangular in cross section. As shown in FIG. 18, each mounting pin is arcuate in a length dimension formed about a circular arc with a center at the axis of rotation of mounting plate 230.

Figure 17:
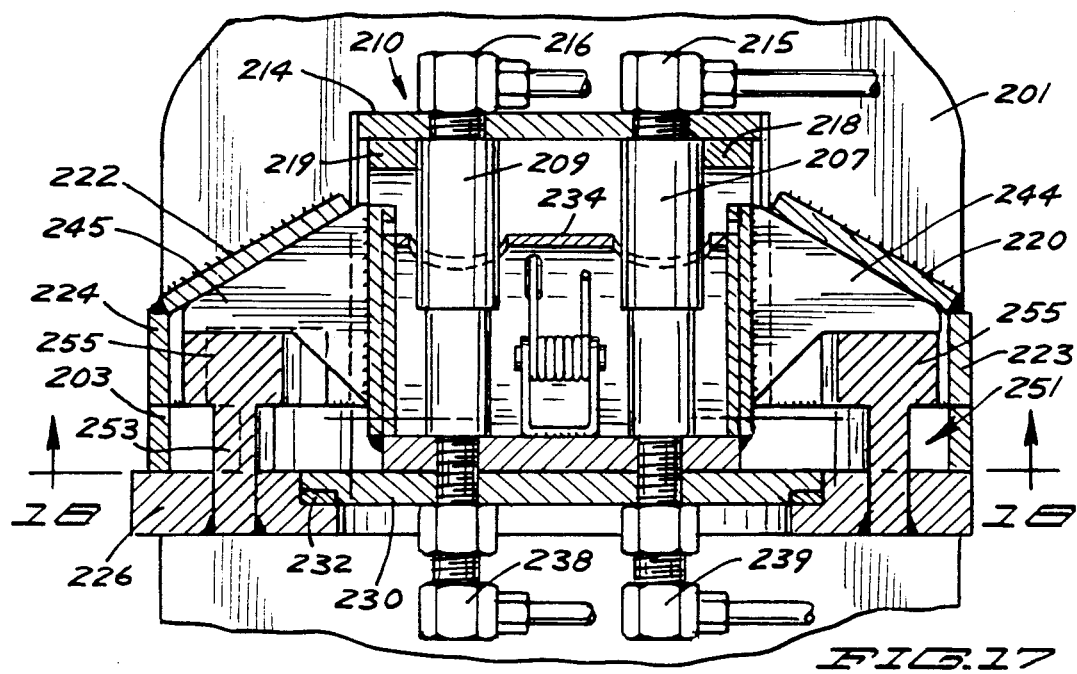
FIG. 17 is a side elevational view partly in section showing the load coupling of FIG. 16 with the upper and lower segments in connected but unlatched position.

Also as shown in FIG. 18, base plate 203 of upper coupling segment 198 has a central access opening 256 that is rectangular in configuration, bounded by the lower edges of the side walls 211, 212 and the lower ends of the arch members 218, 219. Access opening 256 is of a suitable size to permit passage of lower connector housing 234 for connection of the hydraulic connectors in the orientation shown in FIG. 17. Base plate 203 also has key-hole type mounting openings 257, 259 located diametrically opposite one another. Mounting openings 257, 259 have large portions 260A, B for passage of mounting pins 251, 252 and narrow arcuate slots 261A, B connected to the large openings 260A, B and of a width to accommodate the necks 253 of the mounting pins 251, 252. The slots 261 A, B are arcuate and formed about a radius having as a center the axis of rotation of the mounting plate 230 on lower coupling segment 199 when coupled with the upper coupling segment 198 as shown in FIG. 17. The large openings 260A, B are connected to the central opening 256.

In connection of the load coupling 197, the upper and lower coupling segments 198, 199 are initially poised as shown in FIG. 16. Access opening 256 of base plate 203 is poised over the lower connector housing 234 with the arch members 218, 219 positioned in alignment to straddle the housing 234. Lowering of the upper segment 198 onto the lower segment 199 results in the connection shown in FIGS. 17 and 18. Female hydraulic connectors 207, 208 are connected to male connectors 235, 236 as previously described. Heads 255 of mounting pins 251, 252 have passed through the enlarged portions 260A, B of mounting openings 257, 259 and the necks 253 are poised in alignment with the slots 261A, B. Retaining members 244, 245 bear against retaining plates 220, 222. Operation of the rotator on the grapple boom (not shown) rotates the upper load coupling segment relative to the lower load coupling segment from the connected position of FIGS. 17 and 18 to the locked position of FIGS. 19 and 20. The upper load coupling segment has been rotated approximately 90 degrees. The mounting pins have moved into the slots 261A, B and are retained therein. The heads 255 of the mounting pins 251, 252 are retained by the slots as shown in FIG. 20. Mounting plate 230 of lower segment 199 has rotated relative to top wall 226 sliding on washer 228. Mounting plate 230 and lower connector housing 234 rotate with the upper load coupling segment 198. The upper load coupling segment and lower load coupling segment are disconnected through the reverse procedure.

Base plate 203 of the upper load coupling segment and latch plate 226 of the lower load coupling segment are locked from rotation by a solenoid assembly of the type earlier described. A solenoid assembly 263 (FIG. 21) is mounted on the base plate 203 and includes a solenoid coil 264 and a plunger 265. Plunger 265 is movable back and forth or up and down into and out of engagement with an opening on the latch plate 226 of lower load coupling segment 199. Solenoid assembly 263 operates like the solenoid assembly 189 described with respect to FIGS. 12 through 15.

The embodiments of the invention in which an exclusive property or privilege is claimed are defined as follows:

1. A load handling apparatus to move an elongate load over terrain alternatively by towing the load as a grapple skidder with one end elevated above the terrain, and by dragging the load as a choker skidder over the terrain with only a mainline, comprising:

a skidder vehicle movable over terrain in a forward direction;

boom means fixed to the vehicle and extending rearwardly thereof;

hydraulically operated grapple means for engagement of an end of an elongate load;

a supply of hydraulic fluid on the vehicle for actuation of the grapple means;

a load coupling including an upper load coupling segment and a lower load coupling segment releasably connectable to the upper load coupling segment;

said upper load coupling segment connected to the boom means;

said lower load coupling segment connected to the grapple means;

said lower load coupling segment having a latch plate with first latch means; said upper load segment having second latch means; said first and second latch means being interconnectable to connect the first and second load coupling segments;

means on the vehicle remote from the load coupling for remotely connecting and disconnecting the upper and lower load coupling segments by operation of the latch means;

a pair of releasable hydraulic couplings for connecting the hydraulic fluid supply on the vehicle to the grapple means, including first and second upper hydraulic connectors fixed to the upper load coupling segment, and first and second lower hydraulic connectors fixed to the lower load coupling segment and positioned for alignment and connection with the first and second upper hydraulic connectors upon connection of the first and second latch means;

a mainline, one end of the mainline connected to the grapple means, the other end connected to the vehicle, said mainline having a length sufficient for operation of the skidder vehicle as a choker skidder upon disconnection of the upper and lower load coupling segments; and powered drum means permitting playout and reeling in of the mainline relative to the vehicle.

2. The load handling apparatus of claim 1 wherein:

said first latch means on the latch plate is comprised as first and second latch plate edges on opposite sides of the latch plate; said second latch means comprised as opposing hook-like members movable into and out of hooking engagement with the edges of the latch plate.

3. The load handling apparatus of claim 2 wherein: said upper load coupling segment includes first and second side plates; means rotatably connecting the first and second side plates to the boom means; a first latch pivot connected between the first and second side plates; a second latch pivot connected between the first and second side plates spaced generally horizontally from the first latch pivot; a first pair of hook-like latch members pivotally connected to the first latch pivot and having lower ends with hook portions; a second pair of hook-like latch members connected to the second latch pivot and having lower ends with hook portions facing the hook portions of the first latch pivot members; said hook portions of the first and second pairs of latch members movable toward one another a distance corresponding to the distance between the first and second edges of the latch plate, and away from one another a distance to be in clearing relationship to the first and second edges of the latch plate, and means for movement of the hook portions of the latch members toward and away from one another for connection and release of the first and second edges of the latch plate to connect and release the upper load coupling segment and the lower load coupling segment.

4. The load handling apparatus of claim 3 wherein: said means for movement of the hook portions of the first and second pairs of latch members toward and away from one another includes a hydraulic motor of the piston-rod variety connected between ends of the first pair and second pair of latch members opposite the hook portions relative to the first latch pivot and the second latch pivot.

5. The load handling apparatus of claim 4 wherein: said upper hydraulic connectors are comprised as female connectors each having a tubular housing with a sleeve-like opening downwardly orientated, a valve seat recessed in the sleeve-like opening, a poppet valve element movable into and out of sealing engagement with the valve seat, said valve element having a tip extending outward of the valve seat when in sealing engagement with the valve seat, and bias means biasing the poppet valve element in engagement with the valve seat;

said lower hydraulic connectors comprised as male connectors each having a tubular housing with an upper end portion having a diameter to fit within the sleeve-like opening of a female connector, a valve seat at the upper end of the housing, a poppet valve element movable into and out of sealing engagement with the valve seat, said valve element having a tip extending outward of the valve seat when in sealing engagement with the valve seat, and bias means biasing the poppet valve element in engagement with the valve seat;

whereby when an upper hydraulic connector and a lower hydraulic connector are connected, the poppet valve elements are mutually retracted to open a hydraulic fluid passage between the connectors.

6. The load handling apparatus of claim 5 including:

a lower connector housing located on the lower load coupling segment, said lower connector housing containing the first and second lower hydraulic connectors, said lower connector housing having a truncated cylindrical shape with vertical end walls, said lower connector housing having a pair of arcuate sliding doors movable between an open position to expose the lower hydraulic connectors, and a closed position to enclose the lower hydraulic connectors, wing-type members on the doors for engagement by the ends of the upper hydraulic connectors, positioned to move the doors toward the open position upon contact with the ends of the upper hydraulic connectors as the upper load coupling segment is brought into engagement with the lower load coupling segment, and bias means acting on the doors tending to bias the doors toward a closed position.

7. The load handling apparatus of claim 6 wherein: said end walls of the lower connector housing having arcuate grooves, said doors riding in said arcuate grooves between open and closed positions.

8. The load handling apparatus of claim 1 wherein: said upper load coupling segment has a base plate, said second latch means located on the base plate, one of said latch means comprised as a pair of arcuate keyhole type mounting pin openings, the other of said latch means comprised as a pair of mounting pins having enlarged heads and narrow necks corresponding in dimension to the mounting pin openings and positioned for engagement with the mounting pin openings upon bringing together the upper and lower load coupling segments, and for latching the load coupling segments together upon rotation of the upper load coupling segment with respect to the lower load coupling segment.

9. The load handling apparatus of claim 1 wherein: said upper load coupling segment has a base plate, said second latch means including first and second mounting pins connected to the base plate and extending downwardly therefrom, each mounting pin having a narrow neck connected to the base plate and an enlarged head connected to the neck;

said first latch means including first and second arcuate keyhole type mounting pin openings in the latch plate, each mounting pin opening having an enlarged portion of sufficient dimension to permit passage of a head of a mounting pin, and a narrow slot connected to the enlarged portion and of a dimension to accomodate a neck of a mounting pin but restrict passage of the head, said mounting pin openings positioned for receipt of the heads of the mounting pins in the enlarged portions and for receipt of the necks of the mounting pins in the slots upon rotation of the upper load coupling segment relative to the lower load coupling segment when the heads have passed through the enlarged portions of the mounting pin openings to latch the load coupling segments together.

10. A load handling apparatus to move an elongate load over terrain alternatively by towing the load with one end elevated above the terrain, and by dragging the load over the terrain with only a mainline, comprising:

a skidder vehicle movable over terrain in a forward direction;

boom means fixed to the vehicle and extending rearwardly thereof;

hydraulically actuated grapple means for engagement of an end of an elongate load;

said skidder vehicle having a supply of hydraulic fluid for activation of the grapple means;

a load coupling including an upper load coupling segment and a lower load coupling segment releasably connectable to the upper load coupling segment;

said upper load coupling segment connected to the boom means;

said lower load coupling segment connected to the grapple means;

means on the vehicle for remotely connecting and disconnecting the upper and lower load coupling segments;

a pair of releasable hydraulic couplings for connecting the hydraulic fluid supply on the vehicle to the grapple means, including first and second upper hydraulic connectors fixed to the upper load coupling segment, and first and second lower hydraulic connectors fixed to the lower load coupling segment and positioned for connection with the first and second upper hydraulic connectors upon connection of the first and second load coupling segments;

said lower load coupling segment having a latch plate with first latch means; said upper load segment having second latch means; said first and second latch means being interconnectable to connect the first and second load coupling segments;

said upper load coupling segment having a base plate, said second latch means including first and second mounting pins connected to the base plate and extending downwardly therefrom, each mounting pin having a narrow neck connected to the base plate and an enlarged head connected to the neck;

said first latch means including first and second arcuate keyhole type mounting pin openings in the latch plate, each mounting pin opening having an enlarged portion of sufficient dimension to permit passage of a head of a mounting pin, and a narrow slot connected to the enlarged portion end of a dimension to accommodate a neck of a mounting pin but restrict passage of the head, said mounting pin openings positioned for receipt of the heads of the mounting pins in the enlarged portions and for receipt of the necks of the mounting pins in the slots upon rotation of the upper load coupling segment relative to the lower load coupling segment when the heads have passed through the enlarged portions of the mounting pin openings to latch the load coupling segments together;

a circular mounting plate carrying the first and second upper hydraulic connectors and slideably installed in a mounting plate opening located on the upper load coupling segment for rotation about generally vertical axis;

a mainline, one end of the mainline connected to the grapple means, the other end connected to the vehicle; and powered drum means permitting playout and reeling in of the mainline relative to the vehicle.

11. The load handling apparatus of claim 10 including:

an upper hydraulic connector housing located on the upper load coupling segment base plate and having a cylindrical wall located in surrounding relationship to an access opening on the base plate, said cylindrical wall having an upper edge with an inwardly directed lip, said lip defining said mounting plate opening.

12. The load handling apparatus of claim 9 wherein:

said upper hydraulic connectors are comprised as female connectors each having a tubular housing with a sleeve-like opening downwardly orientated, a valve seat recessed in the sleeve-like opening, a poppet valve element movable into and out of sealing engagement with the valve seat, said valve element having a tip extending outward of the valve seat when in sealing engagement with the valve seat, and bias means biasing the poppet valve element in engagement with the valve seat;

said lower hydraulic connectors comprised as male connectors each having a tubular housing with an upper end portion having a diameter to fit within the sleeve-like opening of a female connector, a valve seat at the upper end of the housing, a poppet valve element movable into and out of sealing engagement with the valve seat, said valve element having a tip extending outward of the valve seat when in sealing engagement with the valve seat, and bias means biasing the poppet valve element in engagement with the valve seat;

whereby when an upper hydraulic connector and a lower hydraulic connector are connected, the poppet valve elements are mutually retracted to open a hydraulic fluid passage between the connectors.

13. A load handling apparatus to move an elongate load over terrain alternatively by towing the load with one end elevated above the terrain, and by dragging the load over the terrain with only a mainline, comprising:

a skidder vehicle movable over terrain in a forward direction;

boom means fixed to the vehicle and extending rearwardly thereof;

hydraulically actuated grapple means for engagement of an end of an elongate load;

said skidder vehicle having a supply of hydraulic fluid for activation of the grapple means;

a load coupling including an upper load coupling segment and a lower load coupling segment releasably connectable to the upper load coupling segment;

said upper load coupling segment connected to the boom means;

said lower load coupling segment connected to the grapple means;

means on the vehicle for remotely connecting and disconnecting the upper and lower load coupling segments;

a pair of releasable hydraulic couplings for connecting the hydraulic fluid supply on the vehicle to the grapple means, including first and second upper hydraulic connectors fixed to the upper load coupling segment, and first and second lower hydraulic connectors fixed to the lower load coupling segment and positioned for connection with the first and second upper hydraulic connectors upon connection of the first and second load coupling segments;

said lower load coupling segment having a latch plate with first latch means; said upper load segment having second latch means; said first and second latch means being interconnectable to connect the first and second load coupling segments;

said upper load coupling segment having a base plate, said second latch means including first and second mounting pins connected to the base plate and extending downwardly therefrom, each mounting pin having a narrow neck connected to the base plate and an enlarged head connected to the neck;

said first latch means including first and second arcuate keyhole type mounting pin openings in the latch plate, each mounting pin opening having an enlarged portion of sufficient dimension to permit passage of a head of a mounting pin, and a narrow slot connected to the enlarged portion end of a dimension to accommodate a neck of a mounting pin but restrict passage of the head, said mounting pin openings positioned for receipt of the heads of the mounting pins in the enlarged portions and for receipt of the necks of the mounting pins in the slots upon rotation of the upper load coupling segment relative to the lower load coupling segment when the heads have passed through the enlarged portions of the mounting pin openings to latch the load coupling segments together;

said upper hydraulic connectors comprised as female connectors each having a tubular housing with a sleeve-like opening downwardly orientated, a valve seat recessed in the sleeve-like opening, a poppet valve element movable into and out of sealing engagement with the valve seat, said valve element having a tip extending outward of the valve seat when in sealing engagement with the valve seat, and bias means biasing the poppet valve element in engagement with the valve seat;

said lower hydraulic connectors comprised as male connectors each having a tubular housing with an upper end portion having a diameter to fit within the sleeve-like opening of a female connector, a valve seat at the upper end of the housing, a poppet valve element movable into and out of sealing engagement with the valve seat, said valve element having a tip extending outward of the valve seat when in sealing engagement with the valve seat, and bias means biasing the poppet valve element in engagement with the valve seat;

whereby when a upper hydraulic connector and a lower hydraulic connector are connected, the poppet valve elements are mutually retracted to open a hydraulic fluid passage between the connectors;

a lower connector housing located on the lower load coupling segment, said lower connector housing containing the first and second lower hydraulic connectors, said lower connector housing having a truncated cylindrical shape with vertical end walls, said lower connector housing having a pair of arcuate sliding doors movable a closed position to enclose the lower hydraulic connectors, wing-type members on the doors for engagement by the ends of the upper hydraulic connectors, positioned to move the doors toward the open position upon contact with the ends of the upper hydraulic connectors as the upper load coupling segment is brought into engagement with the lower load coupling segment, and door closure bias means acting on the doors tending to bias the doors toward a closed position;

a mainline, one end of the mainline connected to the grapple means, the other end connected to the vehicle; and powered drum means permitting playout and reeling in of the mainline relative to the vehicle.

14. The load handling apparatus of claim 13 including:

a circular mounting plate carrying the first and second upper hydraulic connectors and slidably installed in a mounting plate opening located on the upper load coupling segment for rotation about a generally vertical axis.

15. The load handling apparatus of claim 14 including:

an upper hydraulic connector housing located on the upper load coupling segment base plate and having a cylindrical wall located in surrounding relationship to an access opening on the base plate, said cylindrical wall having an upper edge with an inwardly directed lip, said lip defining said mounting plate opening.

16. The load handling apparatus of claim 15 wherein: said end walls of the lower connector housing have arcuate grooves, said doors riding in said arcuate grooves between open and closed positions.

17. The load handling apparatus of claim 19 wherein: said heads of the mounting pins are generally bullet shaped.

18. A load handling apparatus to move an elongate load over terrain alternatively by towing the load with one end elevated above the terrain, and by dragging the load over the terrain with only a mainline, comprising:

a skidder vehicle movable over terrain in a forward direction;

boom means fixed to the vehicle and extending rearwardly thereof;

hydraulically actuated grapple means for engagement of an end of an elongate load;

said skidder vehicle having a supply of hydraulic fluid for activation of the grapple means;

a load coupling including an upper load coupling segment and a lower load coupling segment releasably connectable to the upper load coupling segment;

said upper load coupling segment connected to the boom means;

said lower load coupling segment connected to the grapple means;

means on the vehicle for remotely connecting and disconnecting the upper and lower load coupling segments;

a pair of releasable hydraulic couplings for connecting the hydraulic fluid supply on the vehicle to the grapple means, including first and second upper hydraulic connectors fixed to the upper load coupling segment, and first and second lower hydraulic connectors fixed to the lower load coupling segment and positioned for connection with the first and second upper hydraulic connectors upon connection of the first and second load coupling segments;

said lower load coupling segment having a latch plate with first latch means; said upper load segment having second latch means; said first and second latch means being interconnectable to connect the first and second load coupling segments;

said upper load coupling segment having a base plate, said second latch means including first and second mounting pins connected to the base plate and extending downwardly therefrom, each mounting pin having a narrow neck connected to the base plate and an enlarged head connected to the neck;

said first latch means including first and second arcuate keyhole type mounting pin openings in the latch plate, each mounting pin opening having an enlarged portion of sufficient dimension to permit passage of a head of a mounting pin, and a narrow slot connected to the enlarged portion end of a dimension to accommodate a neck of a mounting pin but restrict passage of the head, said mounting pin openings positioned for receipt of the heads of the mounting pins in the enlarged portions and for receipt of the necks of the mounting pins in the slots upon rotation of the upper load coupling segment relative to the lower load coupling segment when the heads have passed through the enlarged portions of the mounting pin openings to latch the load coupling segments together;

a solenoid assembly to lock the first and second load coupling segments together including a solenoid with a movable solenoid plunger located on the base plate, a solenoid plunger opening located on the latch plate in position for receipt of the solenoid plunger when the first and second load coupling segments are in relatively rotated position with the necks of the mounting pins located in the slots of the mounting openings, and control means remotely controllable for operation of the solenoid and solenoid plunger;

a mainline, one end of the mainline connected to the grapple means, the other end connected to the vehicle; and powered drum means permitting playout and reeling in of the mainline relative to the vehicle.

19. The load handling apparatus of claim 1 wherein:
said upper load coupling segment has a base plate, said second latch means including first and second arcuate keyhole type mounting pin openings formed in the base plate in symmetrical relationship, each mounting pin opening including an enlarged portion and a narrow slot extending from the enlarged portion, said mounting openings arcuate about a central axis of rotation of the base plate;
said first latch means including first and second mounting pins symmetrically fixed to the latch plate, each mounting pin having a narrow neck fixed to the latch plate and extending upward, and an enlarged head connected to the neck;
each mounting pin opening enlarged portion of a dimension sufficient to permit passage of the head of a mounting pin, and said slot of a sufficient dimension for receipt of the neck of a mounting pin and restrict passage of the head, said mounting pin openings positioned for receipt of the heads of the mounting pins at the enlarged portions and for receipt of the necks of the mounting pins in the slots upon rotation of the upper load segment relative to the lower load segment with the mounting heads having passage through the enlarged portions of the mounting pin openings to latch together the upper and lower load coupling segments.

20. The load handling apparatus of claim 19 including:
a circular mounting plate carrying the first and second lower hydraulic connectors and slidably installed in a mounting plate opening located on the latch plate for sliding rotation about a generally vertical axis.

21. The load handling apparatus of claim 19 wherein: said mounting pins have a T-shaped cross section and have an arcuate length dimension.

22. The load handling apparatus of claim 19 wherein:
said upper hydraulic connectors are comprised as female connectors each having a tubular housing with a sleeve-like opening downwardly orientated, a valve seat recessed in the sleeve-like opening, a poppet valve element movable into and out of sealing engagement with the valve seat, said valve element having a tip extending outward of the valve seat when in sealing engagement with the valve seat, and bias means biasing the poppet valve element in engagement with the valve seat;
said lower hydraulic connectors comprised as male connectors each having a tubular housing with an upper end portion having a diameter to fit within the sleeve-like opening of a female connector, a valve seat at the upper end of the housing, a poppet valve element movable into and out of sealing engagement with the valve seat, said valve element having a tip extending outward of the valve seat when in sealing engagement with the valve seat, and bias means biasing the poppet valve element in engagement with the valve seat;
whereby when an upper hydraulic connector and a lower hydraulic connector are connected, the poppet valve elements are mutually retracted to open a hydraulic fluid passage between the connectors.

23. The load handling apparatus of claim 22 including:
a lower connector housing located on the lower load coupling segment, said lower connector housing containing the first and second lower hydraulic connectors, said lower connector housing having a truncated cylindrical shape with vertical end walls, said lower connector housing having a pair of arcuate sliding doors movable between an open position to expose the lower hydraulic connectors, and a closed position to enclose the lower hydraulic connectors, wing-type members on the doors for engagement by the ends of the upper hydraulic connectors, positioned to move the doors toward the open position upon contact with the ends of the upper hydraulic connectors as the upper load coupling segment is brought into engagement with the lower load coupling segment, and door closure bias means acting on the doors tending to bias the doors toward a closed position.

24. The load handling apparatus of claim 23 including:
a circular mounting plate carrying said lower connector housing and slidably installed in a mounting plate opening located in the latch plate for rotation about the central axis coincidental with the central axis of rotation of the base plate when the mounting pins are installed in the mounting pin openings.

25. The load handling apparatus of claim 24 wherein: said mounting pins have a T-shaped cross section shape and have an arcuate length dimension.

26. A load handling apparatus to move an elongate load over terrain alternatively by towing the load as a grapple skidder with one end of the load elevated above the terrain, and by dragging the load as a choker skidder over the terrain with only a mainline, comprising:
a skidder vehicle of the type movable over terrain in a forward direction;

a boom fixed to the vehicle and extending rearwardly thereof;

a grapple having a grapple head frame and first and second grapple tines pivotally connected to the head frame and movable between an open position and a closed position to engage an end of an elongate load;

at least one linear hydraulic motor connected to the grapple positioned to move the grapple tines between the open and closed positions;

said vehicle having hydraulic fluid supply means for supply of hydraulic fluid under pressure to the hydraulic motor connected to the grapple for controlling movement of the grapple tines between the open and closed positions;

a load coupling for releasably connecting the boom to the grapple for towing an elongate load with one end of the load elevated above the terrain, said load coupling including an upper load coupling segment connected to the boom and a lower load coupling segment connected to the grapple and releasably connectable to the upper load coupling segment;

means associated with the boom for raising and lowering the upper load coupling segment;

first and second hydraulic couplings for connecting the hydraulic fluid supply means to the hydraulic motor connected to the grapple, including first and second upper hydraulic connectors secured to the upper load coupling segment, and first and second lower hydraulic connectors secured to the lower load coupling segment and releasably interconnectable with the upper hydraulic connectors, said upper and lower hydraulic connectors positioned for connection upon connection of the upper and lower load coupling segments;

said lower load coupling segment having a latch plate with first latch means; said upper load segment having second latch means; said first and second latch means being interconnectable to connect the first and second load coupling segments with the upper hydraulic connectors aligned with the lower hydraulic connectors;

means in the vehicle remote from the load coupling for controlling the latch means for remotely connecting and disconnecting the upper and lower load coupling segments;

a mainline having a first end connected to the grapple and a second end connected to the vehicle for dragging a load over terrain, said mainline having a length sufficient for operation of the skidder vehicle as a choker skidder upon disconnection of the upper and lower load coupling segments; and a powered winch drum secured to the vehicle and engaging the mainline for reeling in and permitting playing out of the mainline relative to the vehicle.

27. The load handling apparatus of claim 26 wherein: said lower load coupling segment includes a latch plate having first and second opposite latch edges, said upper load coupling segment having opposing hook-like latching members positioned for movement into and out of hooking engagement with the edges of the latch plate when the first and second load coupling segments are brought together, a latch member hydraulic motor connected between the hook-like latching members for movement of the latching members toward and away from one another, and control means on the vehicle for the latch member hydraulic motor.

28. The load handling apparatus of claim 26 wherein:

said lower load coupling segment includes a latch plate having first and second opposite latch edges;

said upper load coupling segment having first and second side plates, means rotatably connecting the first and second side plates to the boom, a first latch pivot connected between the first and second side plates, a second latch pivot connected between the first and second side plates spaced generally horizontally from the first latch pivot, a first pair of hook-like latch members pivotally connected to the first latch pivot and having lower ends with hook portions, a second pair of hook-like latch members connected to the second latch pivot and having lower ends with hook portions facing the hook portions of the first pair of latch members, said hook portions of the first and second pairs of latch members movable toward one another a distance corresponding to the distance between the first and second edges of the latch plate, and away from one another a distance to be in clearing relationship to the first and second edges of the latch plate, and means for movement of the hook portions of the latch members toward and away from one another for connection and release of the first and second edges of the latch plate to connect and release the upper load coupling segment and the lower load coupling segment.

29. The load handling apparatus of claim 28 wherein:

said means for movement of the hook portions of the first and second pairs of latch members toward and away from one another includes a hydraulic motor of the piston-rod variety connected between the ends of the first and second pairs of latch members opposite the hook portions relative to the first latch pivot and the second latch pivot, and control means located on the vehicle for control of the hydraulic motor connected between the latch members.

30. The load handling apparatus of claim 26 wherein:

said upper load coupling segment has a base plate, first latch means located on the base plate including first and second mounting pins connected to the base plate and extending downwardly therefrom, each mounting pin having a narrow neck connected to the base plate and an enlarged bullet shaped head connected to the neck;

said lower load coupling segment including a latch plate having second latch means including first and second arcuate keyhole type mounting pin openings in the latch plate, each mounting pin opening having an enlarged portion of sufficient dimension to permit passage of a head of a mounting pin, and a narrow slot connected to the enlarged portion and of a dimension to accommodate a neck of a mounting pin but restrict passage of the head, said mounting pin openings positioned for receipt of the heads of the mounting pins in the enlarged portions and for receipt of the necks of the mounting pins in the slots upon rotation of the upper load coupling segment relative to the lower load coupling segment when the heads have passed through the enlarged portions of the mounting pin openings to latch the load coupling segments together.

31. A load handling apparatus to move an elongate load over terrain alternatively by towing the load with one end of the load elevated above the terrain, and by dragging the load over the terrain with only a mainline, comprising:

a skidder vehicle of the type movable over terrain in a forward direction;

a boom fixed to the vehicle and extending rearwardly thereof;

a grapple having a grapple head frame and first and second grapple tines pivotally connected to the head frame and movable between an open position and a closed position to engage an end of an elongate load;

at least one linear hydraulic motor connected to the grapple positioned to move the grapple tines between the open and closed positions;

said vehicle having hydraulic fluid supply means for supply of hydraulic fluid under pressure to the hydraulic motor connected to the grapple for controlling movement of the grapple tines between the open and closed positions; a load coupling for releasably connecting the boom to the grapple for towing an elongate load with one end of the load elevated above the terrain, said load coupling including an upper load coupling segment connected to the boom and a lower load coupling segment connected to the grapple and releasably connectable to the upper load coupling segment, and means on the vehicle for remotely connecting and disconnecting the upper and lower load coupling segments;

means associated with the boom for raising and lowering the upper load coupling segment;

first and second hydraulic couplings for connecting the hydraulic fluid supply means to the hydraulic motor connected to the grapple, including first and second upper hydraulic connectors secured to the upper load coupling segment, and first and second lower hydraulic connectors secured to the lower load coupling segment and releasably interconnectable with the upper hydraulic connectors, said upper and lower hydraulic connectors positioned for connection upon connection of the upper and lower load coupling segments;

said upper load coupling segment having a base plate, first latch means located on the base plate including first and second mounting pins connected to the base plate and extending downwardly therefrom, each mounting pin having a narrow neck connected to the base plate and an enlarged bullet shaped head connected to the neck;

said lower load coupling segment including a latch plate having second latch means including first and second arcuate keyhole type mounting pin openings in the latch plate, each mounting pin opening having an enlarged portion of sufficient dimension to permit passage of a head of a mounting pin, and a narrow slot connected to the enlarged portion and of a dimension to accommodate a neck of a mounting pin but restrict passage of the head, said mounting pin openings positioned for receipt of the heads of the mounting pins in the enlarged portions and for receipt of the necks of the mounting pins in the slots upon rotation of the upper load coupling segment relative to the lower load coupling segment when the heads have passed through the enlarged portions of the mounting pin openings to latch the load coupling segments together; a circular mounting plate carrying the first and second upper hydraulic connectors and slideably installed in a mounting plate opening located on the upper load coupling segment for rotation about a generally vertical axis.

32. A load handling apparatus to move an elongate load over terrain alternatively by towing the load with one end of the load elevated above the terrain, and by dragging the load over the terrain with only a mainline, comprising:

a skidder vehicle of the type movable over terrain in a forward direction;

a boom fixed to the vehicle and extending rearwardly thereof;

a grapple having a grapple head frame and first and second grapple tines pivotally connected to the head frame and movable between an open position and a closed position to engage an end of an elongate load;

at least one linear hydraulic motor connected to the grapple positioned to move the grapple tines between the open and closed positions;

said vehicle having hydraulic fluid supply means for supply of hydraulic fluid under pressure to the hydraulic motor connected to the grapple for controlling movement of the grapple tines between the open and closed positions;

a load coupling for releasably connecting the boom to the grapple for towing an elongate load with one end of the load elevated above the terrain, said load coupling including an upper load coupling segment connected to the boom and a lower load coupling segment connected to the grapple and releasably connectable to the upper load coupling segment, and means on the vehicle for remotely connecting and disconnecting the upper and lower load coupling segments;

means associated with the boom for raising and lowering the upper load coupling segment;

first and second hydraulic couplings for connecting the hydraulic fluid supply means to the hydraulic motor connected to the grapple, including first and second upper hydraulic connectors secured to the upper load coupling segment, and first and second lower hydraulic connectors secured to the lower load coupling segment and releasably interconnectable with the upper hydraulic connectors, said upper and lower hydraulic connectors positioned for connection upon connection of the upper and lower load coupling segments;

said upper load coupling segment having a base plate, first latch means located on the base plate including first and second mounting pins connected to the base plate and extending downwardly therefrom, each mounting pin having a narrow neck connected to the base plate and an enlarged bullet shaped head connected to the neck;

said lower load coupling segment including a latch plate having second latch means including first and second arcuate keyhole type mounting pin openings in the latch plate, each mounting pin opening having an enlarged portion of sufficient dimension to permit passage of a head of a mounting pin, and a narrow slot connected to the enlarged portion and of a dimension to accommodate a neck of a mounting pin but restrict passage of the head, said mounting pin openings positioned for receipt of the heads of the mounting pins in the enlarged portions and for receipt of the necks of the mounting pins in the slots upon rotation of the upper load coupling segment relative to the lower load coupling segment when the heads have passed through the enlarged portions of the mounting pin openings to latch the load coupling segments together;

an upper hydraulic connector housing located on the upper load coupling segment base plate and having a cylindrical wall located in surrounding relationship to an access opening on the base plate, said cylindrical wall having an upper edge with an inwardly directed lip, said lip defining a mounting plate opening, a circular mounting plate carrying the first and second upper hydraulic connectors and slideably installed in the mounting plate opening for rotation about a generally vertical axis;

a mainline having a first end connected to the grapple and a second end connected to the vehicle for dragging a load over terrain; and a powered winch drum secured to the vehicle and engaging the mainline for reeling in and permitting playing out of the mainline relative to the vehicle.

33. The load handling apparatus of claim 26 wherein:
said upper load coupling segment has a base plate, first and second arcuate keyhole type mounting pin openings formed in the base plate in symmetrical relationship, each mounting pin opening including an enlarged portion and a narrow slot extending from the enlarged portion, said mounting plate openings arcuate about a central axis of rotation of the base plate;

said lower load coupling segment having a latch plate, first and second mounting pins symmetically fixed to the latch plate, each mounting pin having a narrow neck fixed to the latch plate and extending upward, and an enlarged head connected to the neck;

each mounting pin opening enlarged portion of a dimension sufficient to permit passage of the head of a mounting pin, and said slot of a sufficient dimension for receipt of the neck of a mounting pin and restrict passage of the head, said mounting pin openings positioned for receipt of the heads of a mounting pins at the enlarged portion and for receipt of the necks of the mounting pins in the slots upon rotation of the upper load segment relative to the lower load segment about the central axis of rotation of base plate with the mounting pin heads having passed through the enlarged portions of the mounting pin openings to latch together the upper and lower load coupling segments.

34. The load handling apparatus of claim 33 wherein:
said mounting pins have a T-shaped cross section and have an arcuate length dimension.

35. The load handling apparatus of claim 34 wherein:
said latch plate has a circular mounting plate opening, a circular mounting plate carrying the first and second lower hydraulic connectors slidably installed in the mounting plate opening for rotation about a generally vertical axis.

36. The load handling apparatus of claim 26 wherein:
said upper hydraulic connectors are comprised as female connectors each having a tubular housing with a sleeve-like opening downwardly orientated, a valve seat recessed in the sleeve-like opening, a poppet valve element movable into and out of sealing engagement with the valve seat, said valve element having a tip extending outward of the valve seat when in sealing engagement with the valve seat, and bias means biasing the poppet valve element in engagement with the valve seat;

said lower hydraulic connectors comprised as male connectors each having a tubular housing with an upper end portion having a diameter to fit within the sleeve-like opening of a female connector, a valve seat at the upper end of the housing, a poppet valve element movable into and out of sealing engagement with the valve seat, said valve element having a tip extending outward of the valve seat when in sealing engagement with the valve seat, and bias means biasing the poppet valve element in engagement with the valve seat;

whereby when an upper hydraulic connector and a lower hydraulic connector are connected, the poppet valve elements are mutually retracted to open a hydraulic fluid passage between the connectors.

37. A load handling apparatus to move an elongate load over terrain alternatively by towing the load with one end of the load elevated above the terrain, and by dragging the load over the terrain with only a mainline, comprising:

a skidder vehicle of the type movable over terrain in a forward direction;

a boom fixed to the vehicle and extending rearwardly thereof;

a grapple having a grapple head frame and first and second grapple tines pivotally connected to the head frame and movable between an open position and a closed position to engage an end of an elongate load;

at least one linear hydraulic motor connected to the grapple positioned to move the grapple tines between the open and closed positions;

said vehicle having hydraulic fluid supply means for supply of hydraulic fluid under pressure to the hydraulic motor connected to the grapple for controlling movement of the grapple tines between the open and closed positions;

a load coupling for releasably connecting the boom to the grapple for towing an elongate load with one end of the load elevated above the terrain, said load coupling including an upper load coupling segment connected to the boom and a lower load coupling segment connected to the grapple and releasably connectable to the upper load coupling segment, and means on the vehicle for remotely connecting and disconnecting the upper and lower load coupling segments;

means associated with the boom for raising and lowering the upper load coupling segment;

first and second hydraulic couplings for connecting the hydraulic fluid supply means to the hydraulic motor connected to the grapple, including first and second upper hydraulic connectors secured to the upper load coupling segment, and first and second lower hydraulic connectors secured to the lower load coupling segment and releasably interconnectable with the upper hydraulic connectors, said upper and lower hydraulic connectors positioned for connection upon connection of the upper and lower load coupling segments;

said upper hydraulic connectors comprised as female connectors each having a tubular housing with a sleeve-like opening downwardly orientated, a valve seat recessed in the sleeve-like opening, a poppet valve element movable into and out of sealing engagement with the valve seat, said valve element having a tip extending outward of the valve seat when in sealing engagement with the valve seat, and bias means biasing the poppet valve element in engagement with the valve seat;

said lower hydraulic connectors comprised as male connectors each having a tubular housing with an upper end portion having a diameter to fit within the sleeve-like opening of a female connector, a valve seat at the upper end of the housing, a poppet valve element movable into and out of sealing engagement with the valve seat, said valve element having a tip extending outward of the valve seat when in sealing engagement with the valve seat, and bias means biasing the poppet valve element in engagement with the valve seat;

whereby when a upper hydraulic connector and a lower hydraulic connector are connected, the poppet valve elements are mutually retracted to open a hydraulic fluid passage between the connectors;

a lower connector housing located on the lower load coupling segment, said lower connector housing containing the first and second lower hydraulic connectors, said lower connector housing having a truncated cylindrical shape with vertical end walls, said lower connector housing having a pair of arcuate sliding doors movable between an open position to expose the lower hydraulic connectors, and a closed position to enclose the lower hydraulic connectors, wing-type members on the doors for engagement by the ends of the upper hydraulic connectors, positioned to move the doors toward the open position upon contact with the ends of the upper hydraulic connectors as the upper load coupling segment is brought into engagement with the lower load coupling segment, and bias means acting on the doors tending to bias the doors toward a closed position;

a mainline having a first end connected to the grapple and a second end connected to the vehicle for dragging a load over terrain; and a powered winch drum secured to the vehicle and engaging the mainline for reeling in and permitting playing out of the mainline relative to the vehicle.

* * * * *

UNITED STATES PATENT AND TRADEMARK OFFICE
CERTIFICATE OF CORRECTION

PATENT NO. : 5,141,386
DATED : August 25, 1992
INVENTOR(S) : Robert D. Barwise It is certified that error appears in the above-identified patent and that said Letters Patent is hereby corrected as shown below:

Col. 7, line 10 "essembly" should be ---assembly---.

Col. 8, line 32 after lip "147" should be ---148---.

Claim 13, Col. 17, line 53 after movable insert ---between an open position to expose the lower hydraulic connectors, and---.

Claim 17, Col. 18, line 33 "19" should be ---9---.

Claim 37, Col. 27, line 14 "a" (first occurence) should be ---an---.

Signed and Sealed this

Fourteenth Day of September, 1993

Attest:

BRUCE LEHMAN

*Attesting Officer*     *Commissioner of Patents and Trademarks*